(12) United States Patent
Kawai et al.

(10) Patent No.: US 6,314,807 B1
(45) Date of Patent: Nov. 13, 2001

(54) THERMAL-TYPE FLOW SENSOR

(75) Inventors: Masahiro Kawai; Tomoya Yamakawa, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/481,591

(22) Filed: Jan. 12, 2000

(30) Foreign Application Priority Data

Jul. 14, 1999 (JP) .................................................. 11-200137

(51) Int. Cl.[7] ....................................................... G01F 1/68
(52) U.S. Cl. ........................................................ 73/204.26
(58) Field of Search ........................... 73/204.26, 204.11, 73/118.2, 204.15, 204.16

(56) References Cited

U.S. PATENT DOCUMENTS

| 5,708,205 | * | 1/1998 | Yamada et al. | ................... | 73/204.26 |
| 5,892,150 | * | 4/1999 | Isono et al. | ........................ | 73/204.26 |

FOREIGN PATENT DOCUMENTS

| 60-142268 | 7/1985 | (JP) | .................................. | G01P/5/10 |
| 7-174600 | 7/1995 | (JP) | .................................. | G01F/1/68 |

* cited by examiner

*Primary Examiner*—Harshad Patel
(74) *Attorney, Agent, or Firm*—Sughrue, Mion, Zinn, Macpeak & Seas, PLLC

(57) ABSTRACT

A thermal-type flow sensor of high detection sensitivity and reliability in which a temperature measuring resistor is maintained at a predetermined temperature includes a plate-like substrate (1), a low heat capacity portion (13A) formed on a surface of the substrate (1), a heat generating resistor pattern (4) and a temperature measuring resistor (14) disposed on the low heat capacity portion (13A) and each formed of a heat-sensitive resistance film, and a control circuit (50) for applying a constant voltage (Vcc) to the temperature measuring resistor (14) while supplying a heating current (i) to the heat generating resistor pattern (4) for thereby outputting a flow-rate measurement signal derived on the basis of the heating current (i). The heat generating resistor pattern (4) and the temperature measuring resistor (14) are disposed essentially on a planar array along a direction in which a fluid destined for measurement flows. The temperature measuring resistor (14) is disposed internally of the heat generating resistor pattern (4) at a location upstream of a peak position of a temperature distribution making appearance in the flow direction of the fluid under the action of heat generated by the heat generating resistor pattern (4).

14 Claims, 18 Drawing Sheets

100: THERMAL-TYPE FLOW SENSOR

40: CONTROL CIRCUIT SUBSTRATE BOARD

THERMAL-TYPE FLOW SENSOR

BACKGROUND OF THE INVENTION

1. Field of the Invention

The present invention relates generally to a thermal-type flow sensor for measuring a flow rate, for example, of intake air in an internal combustion engine. More particularly, the present invention is concerned with a thermal-type flow sensor for measuring a flow rate (or flow velocity) of a fluid by taking advantage of a phenomenon of heat transfer from a heat generating element (or a part heated by the heat generating element) to the fluid, which sensor can assure an enhanced detection sensitivity and an improved reliability.

2. Description of Related Art

For better understanding of the concept underlying the present invention, description will first be made of conventional thermal-type flow sensors known heretofore by reference to figures. FIG. 18 shows in a top plan view a bridge type flow rate detecting device 18 employed in a conventional thermal-type flow sensor disclosed, for example, in Japanese Patent Publication No. 7659/1993, wherein the flow rate detecting device 18 is shown in a state where a protection film 3 is removed, and FIG. 19 shows a side-elevational sectional view of the same taken along a line X—X in FIG. 18.

Referring to FIGS. 18 and 19, a plate-like substrate 1 is made of a silicon semiconductor material.

The thermal-type flow sensor is further composed of a supporting or base film 2 and the protection film 3 each formed of an insulative silicon nitride material deposited over a whole top surface of the substrate 1. A heat generating resistor pattern 4 deposited on the base film 2 is formed of a heat-sensitive resistance film such as of permalloy, platinum or the like. In this conjunction, the term "heat-sensitive resistance film" means a resistant film formed of a material whose resistance value exhibits a temperature dependency.

Temperature measuring resistor patterns 5 and 6 also deposited on the base film 2 are each formed of a heat-sensitive resistance film similarly to the heat generating resistor pattern 4. The temperature measuring resistor patterns 5 and 6 are disposed, respectively, at both sides of the heat generating resistor pattern 4 on a same plane as the latter. More specifically, the temperature measuring resistor patterns 5 and 6 are juxtaposed in a planar array in a fluid flow direction (indicated by an arrow G in FIG. 18) with the heat generating resistor pattern 4 being interposed therebetween.

A reference resistor pattern 7 also deposited on the base film 2 is formed of a heat-sensitive resistance film similarly to the patterns mentioned above and deposited or disposed on a same plane as the heat generating resistor pattern 4 and the temperature measuring resistor patterns 5 and 6.

The heat generating resistor pattern 4, the temperature measuring resistor patterns 5 and 6 and the reference resistor pattern 7 are incorporated in a control circuit of a thermal-type flow sensor in the manner well known in the art, although illustration thereof is omitted.

More specifically, the reference resistor pattern 7 constitutes a bridge circuit through cooperation with the temperature measuring resistor patterns 5 and 6, wherein a constant voltage is applied across the bridge circuit from the control circuit. On the other hand, a heating current is fed to the heat generating resistor pattern 4 from the control circuit, whereby a voltage making across the heat generating resistor pattern 4 and corresponding to the heating current is outputted as a flow-rate measurement signal.

A pair of openings 8 are formed in the vicinity of the array or region of the heat generating resistor pattern 4 and the temperature measuring resistor patterns 5 and 6 at upstream and downstream sides thereof, wherein the pair of openings 8 are communicated to each other through an air space 9.

The air space 9 is formed by removing partially the silicon semiconductor material through the openings 8 by using a liquid-phase etchant which does not exert any adverse influence to the silicon nitride film.

In this manner, the array composed of the heat generating resistor pattern 4 and the temperature measuring resistor patterns 5 and 6 forms a bridge portion 11 (low heat capacity portion).

Next, description will be directed to operation of the conventional thermal-type flow sensor in which the flow rate detecting device 18 shown in FIGS. 18 and 19 is employed.

The heating current supplied to the heat generating resistor pattern 4 from the control circuit (not shown) is so controlled that the heat generating resistor pattern 4 can be heated to a predetermined temperature which is higher, for example, by 200° C. than the temperature of the plate-like substrate 1 which is detected by the reference resistor pattern 7.

Heat generated by the heat generating resistor pattern 4 is transferred to the temperature measuring resistor patterns 5 and 6 by way of the base film 2 and the protection film 3 and/or other heat-sensitive resistance film(s), if present.

In this conjunction, it is to be noted that the temperature measuring resistor patterns 5 and 6 are disposed at respective positions symmetrically to each other with reference to the heat generating resistor pattern 4. Accordingly, so long as no fluid flow exists, there will arise no difference in the resistance value between the temperature measuring resistor patterns 5 and 6.

By contrast, when fluid flow such as air flow exists on and along the temperature measuring resistor patterns 5 and 6, the temperature measuring resistor pattern located at the upstream side as viewed in the fluid flow direction is cooled by the air, while the temperature measuring resistor pattern located at the downstream side is not cooled to a same extent as the temperature measuring resistor pattern positioned at the upstream side, because the downstream temperature measuring resistor pattern is less susceptible to the influence of heat transferred from the heat generating resistor pattern 4 to the air when compared with the upstream temperature measuring resistor pattern.

By way of example, it is assumed that the air flow takes place in the direction indicated by the arrow G in FIGS. 18 and 19. Then, the temperature of the upstream temperature measuring resistor pattern becomes lower than that of the downstream temperature measuring resistor pattern 6. In general, difference in the resistance value between the temperature measuring resistor patterns 5 and 6 increases as the flowing velocity or flow rate of the fluid (air) becomes high.

Thus, by detecting the resistance values of the temperature measuring resistor patterns 5 and 6, respectively, it is possible to measure the flowing velocity or the flow rate of the air.

Such measurement of the flow rate can equally be performed even in the case where the air flows in the direction opposite to that indicated by the arrow G because then the temperature of the temperature measuring resistor pattern 6 becomes lower than that of the temperature measuring resistor pattern 5. Besides, with the arrangement of the heat generating resistor pattern 4 and the temperature measuring resistor patterns 5 and 6, the fluid flow direction can also be detected.

The foregoing description has been made of the flow rate detecting device 18 which includes the bridge portion 11 as the low heat capacity portion. It is however to be mentioned that a wide variety of flow rate detecting devices have also been proposed in which a diaphragm, for example, is employed as the low heat capacity portion.

FIG. 20 is a top plan view showing a diaphragm type flow rate detecting device 18a employed in a conventional thermal-type flow sensor, wherein the flow rate detecting device 18a is shown in a state where a protection film is removed, and FIG. 21 is a side-elevational sectional view of the same taken along a line Y—Y in FIG. 20. In FIGS. 20 and 21, components same as or equivalent to those mentioned hereinbefore by reference to FIGS. 18 and 19 are denoted by like reference characters, and detailed description thereof will be omitted.

As can be seen in FIGS. 20 and 21, the plate-like substrate 1 has a cavity 12 which is formed by removing partially the material of the plate-like substrate 1 through an etching process from the side opposite to the surface of the plate-like substrate 1 on which the base film 2 is deposited.

Thus, the base film 2 and the protection film 3 between which the heat generating resistor pattern 4 and the temperature measuring resistor patterns 5 and 6 are sandwiched cooperate to constitute a diaphragm 13, as can clearly be seen in FIG. 21.

Parenthetically, it should be mentioned that the diaphragm type flow rate detecting device 18a shown in FIGS. 20 and 21 can ensure higher mechanical strength when compared with the bridge type flow rate detecting device 18 described hereinbefore by reference to FIGS. 18 and 19.

Thus, the diaphragm type flow rate detecting device 18a is suited for use under severe environmental conditions such as encountered in detecting the intake-air flow rate in an engine for a motor vehicle. Incidentally, in the diaphragm type flow rate detecting device 18a, the principle of detecting the flow rate (or flowing velocity) of the air is essentially same as that incarnated in the bridge type flow rate detecting device 18 described hereinbefore.

As another one of the thermal-type flow sensors known heretofore, there may be mentioned an indirect heating type flow sensor in which a heat measuring element is disposed at an upstream position as viewed in the fluid flow direction with a heating element being disposed at a downstream position in order to realize output improved characteristics exhibiting high linearity as a function of the flowing velocity, as is disclosed, for example, in Japanese Unexamined Patent Application Publication No. 174600/1995 (JP-A-7-174600).

Of the thermal-type flow sensors mentioned above, the thermal-type flow sensor which incorporates the bridge type flow rate detecting device 18 (shown in FIGS. 18 and 19) can not assure sufficiently high mechanical strength when compared with the thermal-type flow sensor in which the diaphragm type flow rate detecting device 18a (shown in FIGS. 20 and 21) is employed, because the area over which the bridge portion 11 is physically supported by the plate-like substrate 1 is smaller in the case of the bridge type flow rate detecting device 18.

Accordingly, in order to realize a sufficiently high mechanical strength in the bridge type flow rate detecting device 18, it is required to increase the film thickness of the bridge portion 11 as a whole or increase the area over which the bridge portion 11 is brought into contact with the plate-like substrate 1. In that case, however, the overall size of the thermal-type flow sensor will increase, to a disadvantage.

On the other hand, the thermal-type flow sensor in which the flow rate detecting device 18a is employed is certainly advantageous in respect to the mechanical strength as compared with the flow sensor having the bridge type flow rate detecting device 18. However, in the case of the former, the diaphragm 13 is brought into contact with the plate-like substrate 1 along the whole circumstance of the diaphragm 13. Consequently, an increased amount of heat generated by the heat generating resistor pattern 4 will be transferred to the plate-like substrate 1 by way of the diaphragm 13, which results in degradation of the flow-rate detection sensitivity of the thermal-type flow sensor, giving rise to a problem.

It is further noted that in the flow rate detecting device 18a incorporating the diaphragm 13 contacted to the plate-like substrate 1 over the whole circumference of the diaphragm, it is difficult to enlarge the area of the heat generating resistor pattern 4, which means that the heat transfer rate can not be increased, thus incurring a problem that the flow-rate detection sensitivity is low.

Certainly, the detection sensitivity of the flow rate detecting device 18a can be protected against degradation to some extent by forming the diaphragm 13 as large and thin as possible. In that case, however, the strength of the diaphragm 13 becomes low, presenting a problem in practical applications.

By the way, in the measurement, for example, of the intake-air flow rate in an internal combustion engine, an anti-dust filter is ordinarily disposed at a position upstream of the thermal-type flow sensor. However, fine dust particles and moisture can pass through the filter to be deposited on the flow rate detecting device, as known by those skilled in the art.

Deposition of the dust and the moisture mentioned above will of course be accompanied with contamination of the flow rate detecting device, which will bring about variation or change more or less in the heat transfer characteristic between the flow rate detecting device and the air flow, as a result of which drift may undesirably occur in the flow-rate detection characteristics.

Such being the circumstances, it is also known heretofore to suppress the drift of the flow-rate detection characteristics of the sensor by burning the dusts while gasifying the moisture by increasing the temperature of the flow rate detecting device in order to cope with the contamination of the flow rate detecting device.

However, because the ambient temperature of the heat generating resistor pattern 4 becomes lower as the distance from the heat generating resistor pattern 4 increases, and when the temperature measuring resistor is disposed at the upstream side of the heating element with a view to improving the detection sensitivity, as disclosed in Japanese Unexamined Patent Application Publication No. 174600/1995, the dust and moisture deposited on the temperature measuring resistor can not be removed because the temperature of the temperature measuring resistor is lower than that of the heating element. Thus, degradation will be involved in the anti-contamination performance of the flow sensor.

On the other hand, when the temperature of the temperature measuring resistor is set high by setting high the temperature of the heating element in order to protect the flow rate detecting device against degradation of the anti-contamination performance, the diaphragm 13 may possibly be impaired or damaged under the adverse influence of the heat because the temperature of the heating element disposed downstream of the temperature measuring resistor must be set high particularly when the flow rate is high, incurring thus degradation of reliability of the operation of the thermal-type flow sensor.

More specifically, assuming that the temperature of the heating element is set at a predetermined level capable of preventing the contamination, then the temperature of the temperature measuring resistor is necessarily lower than that predetermined level, as a result of which contamination of the temperature measuring resistor will occur. On the other hand, when the temperature of the temperature measuring resistor is set at the aforementioned predetermined level, then the temperature of the heating element has to be set higher than that predetermined level mentioned above, which will involve damage of the diaphragm.

It is further noted that in the case where the thermal-type flow sensor is employed as an intake air flow sensor in a vehicle-onboard internal combustion engine for effectuating the fuel control, a sum of the flow rate in the reverse flow direction and that in the forward flow direction will be detected as the intake-air flow rate in the state where pulsating flow phenomenon accompanied with the reverse flow of the intake air is taking place in an operation range where the throttle opening degree is set large (known as the valve overlap operation region). Thus, flow-rate detection error twice as large as the flow rate in the reverse direction may occur.

As is apparent from the foregoing description, the conventional thermal-type flow sensor in which the bridge type flow rate detecting device 18 is employed suffers a problem that sufficient strength can not be ensured because the area over which the bridge portion 11 is supported on the plate-like substrate 1 is small.

On the other hand, the hitherto known thermal-type flow sensor in which the diaphragm type flow rate detecting device 18a is employed is disadvantageous in that because the diaphragm 13 is in constant with the plate-like substrate 1 along the whole peripheral portion, the amount of heat conducted to the plate-like substrate 1 from the heat generating resistor pattern 4 by way of the diaphragm 13 is large and that attempt for increasing the area of the heat generating resistor pattern 4 encounters difficulty in practical application, as a result of which high flow-rate detection sensitivity can not be realized.

Further, when the temperature measuring resistor is disposed at the upstream side of the heating element (heat generating resistor pattern), as disclosed in Japanese Unexamined Patent Application Publication No. 174600/1995, the dust and moisture deposited on the temperature measuring resistor can not be removed because the temperature of the temperature measuring resistor is lower than the temperature of the heating element. Thus, degradation will be involved in the anti-contamination performance, giving rise a problem.

In conjunction with the flow sensor mentioned just above, it is further noted that when the temperature of the temperature measuring resistor is set to a higher level in an effort to protect the anti-contamination performance against degradation, the temperature of the heating element disposed downstream of the temperature measuring resistor becomes excessively high, giving rise to anther problem that the thermal reliability is lowered.

Moreover, it is noted that in the case where the conventional flow rate detecting device is employed in the intake air flow sensor for the vehicle-onboard internal combustion engine, the flow rate in the reverse flow direction upon occurrence of the pulsating flow phenomenon will be detected intactly as that in the forward flow direction. Thus, flow-rate detection error substantially twice as large as the reverse flow rate may occur, to a further problem.

SUMMARY OF THE INVENTION

In the light of the state of the art described above, it is an object of the present invention to provide a thermal-type flow sensor with which the various problems the conventional thermal-type flow sensors suffer can be solved satisfactorily and which can assure enhanced detection sensitivity and improved reliability.

In view of the above and other objects which will become apparent as the description proceeds, the present invention teaches that in the thermal-type flow sensor in which a diaphragm type flow rate detecting device is employed, a temperature measuring resistor is disposed internally of a heat generating resistor pattern at a position upstream of a peak position of a temperature distribution making appearance in a flow direction of a fluid under the action of heat generation of the heat generating resistor pattern, to thereby sustain the temperature of the temperature measuring resistor while setting the detection sensitivity higher in a forward flow direction than in a reverse flow direction.

Thus, according to a general aspect of the present invention, there is provided a thermal-type flow sensor which includes a plate-like substrate, a low heat capacity portion formed on a surface of the substrate, a heat generating resistor pattern and a temperature measuring resistor disposed at the low heat capacity portion and each formed of a heat-sensitive resistance film, and a control circuit for applying a constant voltage to the temperature measuring resistor while supplying a heating current to the heat generating resistor pattern for thereby outputting a flowrate measurement signal derived on the basis of the heating current, wherein the heat generating resistor pattern and the temperature measuring resistor are disposed essentially in a planar array along a direction in which a fluid destined for measurement flows, while the temperature measuring resistor is disposed internally of the heat generating resistor pattern at a location upstream of a peak position of a temperature distribution making appearance in the flow direction of the fluid under the action of heat generated by the heat generating resistor pattern.

With the arrangement of the thermal-type flow sensor described above, it is possible to set higher the detection sensitivity in the forward flow direction than in the reverse flow direction while sustaining the temperature of the temperature measuring resistor. Thus, there can be realized the thermal-type flow sensor which can enjoy enhanced detection sensitivity and improved reliability.

In a preferred mode for carrying out the invention, the temperature measuring resistor may be disposed internally of the heat generating resistor pattern at a location upstream of a center portion of the heat generating resistor pattern as viewed in the flow direction of the fluid.

By virtue of the arrangement described above, the detection sensitivity and the reliability of the thermal-type flow sensor can further be enhanced and improved.

In another preferred mode for carrying out the invention, a dummy pattern playing substantially no role in measuring the flow rate may be disposed at the low heat capacity portion at a position substantially symmetrically to the temperature measuring resistor.

With the arrangement described above, the low heat capacity portion can effectively be protected against undesirable mechanical or physical deformation.

In yet another preferred mode for carrying out the invention, such arrangement may be adopted that the distribution of temperature making appearance under the action of heat generated by the heat generating resistor pattern is deviated downstream as viewed in the fluid flow direction.

Owing to the arrangement described above, the detection sensitivity as well as the reliability of the thermal-type flow sensor can be enhanced.

In still another preferred mode for carrying out the invention, the heat generating resistor pattern may be arranged such that a portion of the heat generating resistor pattern located downstream as viewed in the fluid flow direction has a greater resistance value than that of a portion of the heat generating resistor pattern located upstream as viewed in the fluid flow direction.

The arrangement described above can generally contribute to realization of high detection sensitivity as well as improved reliability of the thermal-type flow sensor.

In a further preferred mode for carrying out the invention, the heat generating resistor pattern may be comprised of sparse and dense portions having different pattern stripe widths, respectively, wherein the dense portion of a narrower pattern stripe width than that of the sparse portion is disposed downstream of the temperature measuring resistor as viewed in the fluid flow direction.

By virtue of the above-mentioned arrangement, the detection sensitivity and the reliability of the thermal-type flow sensor can be enhanced and improved as well.

In a yet further preferred mode for carrying out the invention, the heat generating resistor pattern may be comprised of thick and thin portions having different pattern thicknesses, respectively, wherein the thin portion of a smaller pattern thickness than that of the thick portion is disposed downstream of the temperature measuring resistor as viewed in the fluid flow direction.

The above-mentioned arrangement is equally effective for enhancing and improving the detection sensitivity and the reliability of the thermal-type flow sensor.

In a still further preferred mode for carrying out the invention, the heat generating resistor pattern may be disposed at the low heat capacity portion at a location upstream of a center portion of the low heat capacity portion as viewed in the fluid flow direction.

With the above-mentioned arrangement, the detection sensitivity and the reliability of the thermal-type flow sensor can be enhanced and improved as well.

Furthermore, in a mode for carrying out the invention, the temperature measuring resistor of the thermal-type flow sensor mentioned above may be disposed internally of the heat generating resistor pattern at a center portion thereof as viewed in the fluid flow direction.

With the arrangement of the thermal-type flow sensor described above, the low heat capacity portion can effectively be protected against undesirable mechanical or physical deformation.

In another preferred mode for carrying out the invention, the constant voltage applied to the temperature measuring resistor may be set to a minimum voltage value at which the temperature measuring resistor can spontaneously generate heat.

Owing to the arrangement of the thermal-type flow sensor described above, it is possible to compensate for heat loss in the heat transfer or conduction from the heat generating resistor pattern to the substrate.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
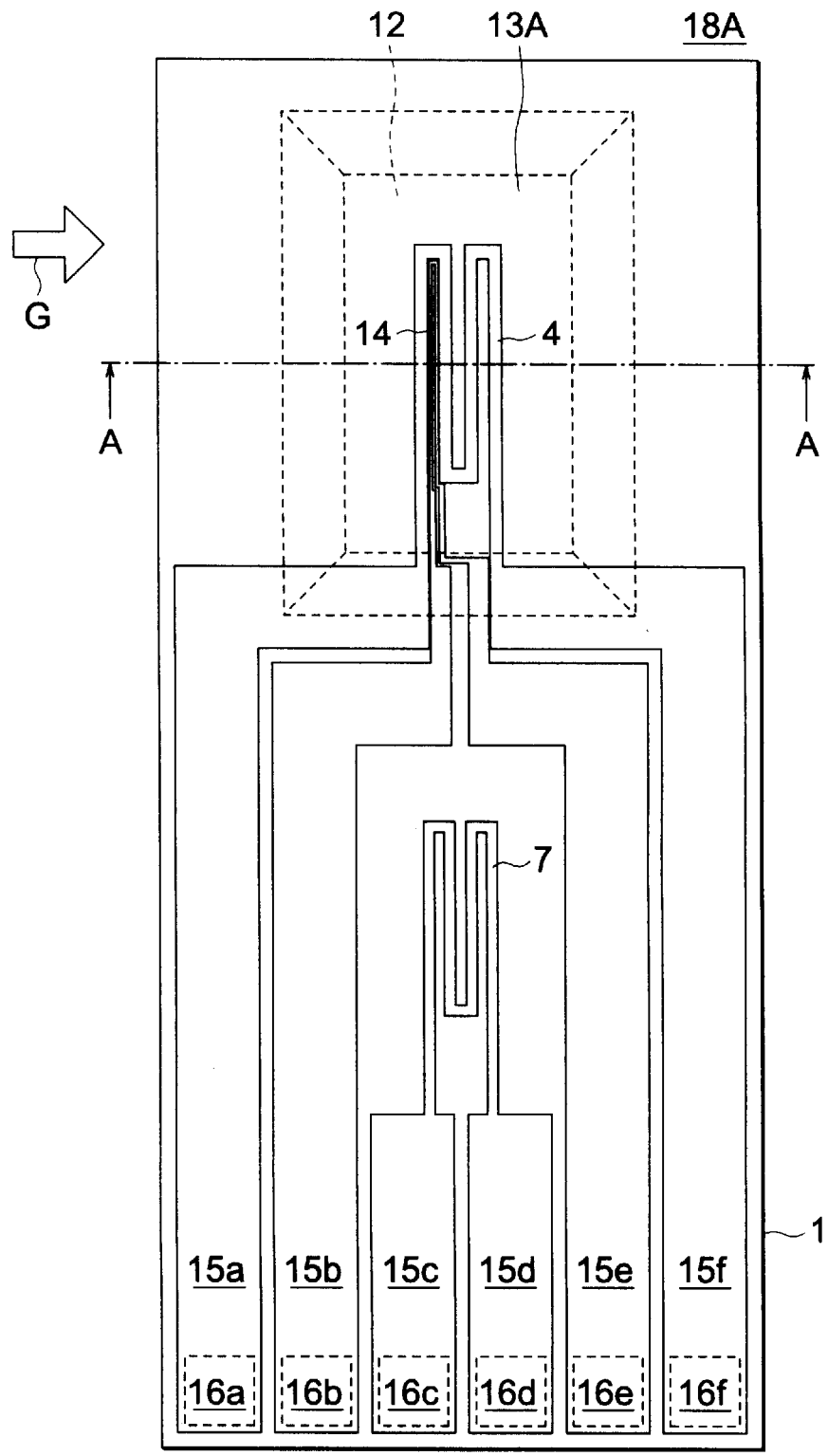
FIG. 1 is a top plan view showing a flow rate detecting device employed in a thermal-type flow sensor according to a first embodiment of the invention, wherein the flow rate detecting device is shown in a state where a protection film is removed.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "top", "bottom", "vertical" and the like are words of convenience and are not to be construed as limiting terms.

Embodiment 1

Now, referring to FIGS. 1 to 9, description will be made in detail of a thermal-type flow sensor according to a first embodiment of the present invention.

Figure 2:
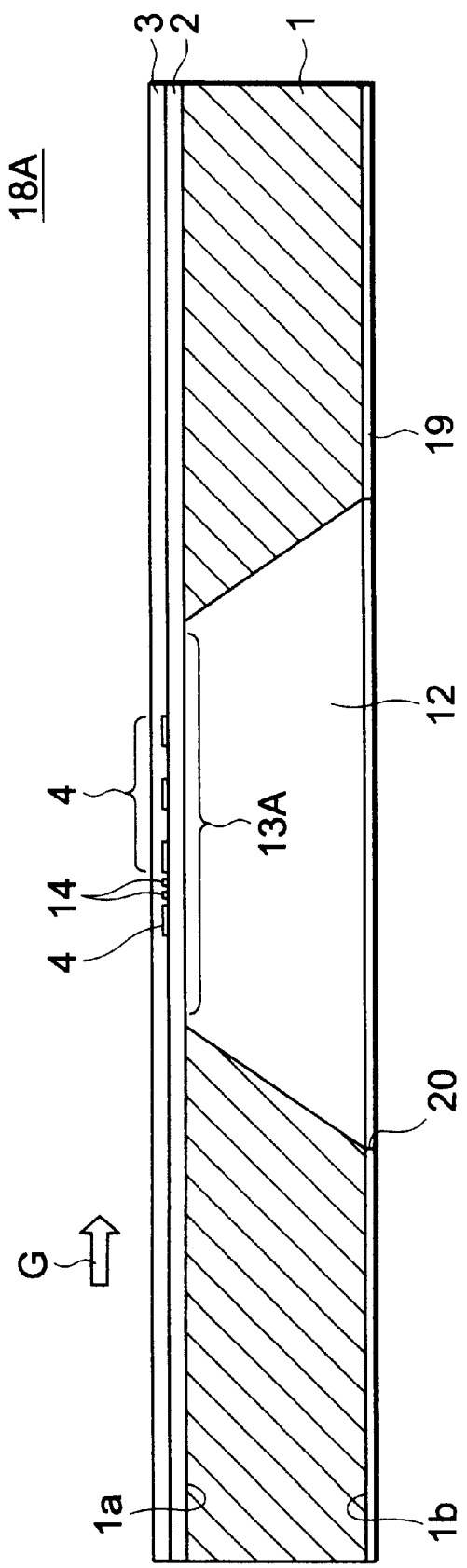
FIG. 2 is a side-elevational sectional view of the flow detecting device taken along a line A—A in FIG. 1.

FIG. 1 is a top plan view showing a flow rate detecting device 18A employed in the thermal-type flow sensor according to the first embodiment of the invention, wherein the flow rate detecting device 18A is shown in a state where a protection film 3 is removed, and FIG. 2 is a side-elevational sectional view of the same taken along a line A—A in FIG. 1.

Figure 20:
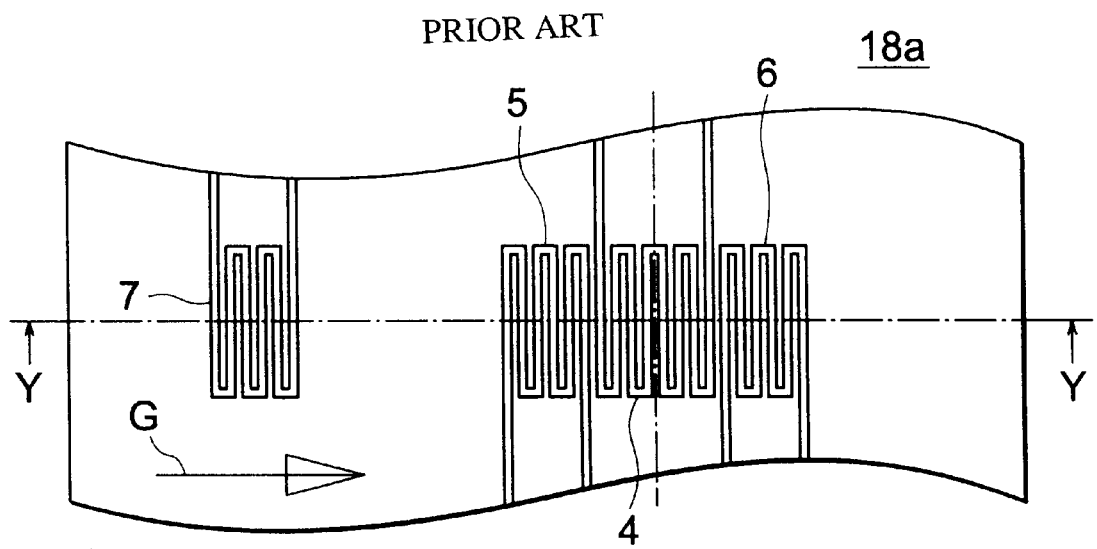
FIG. 20 is a top plan view showing a diaphragm type flow rate detecting device employed in a conventional thermal-type flow sensor, wherein the flow rate detecting device is shown in a state where a protection film is removed.
Figure 21:
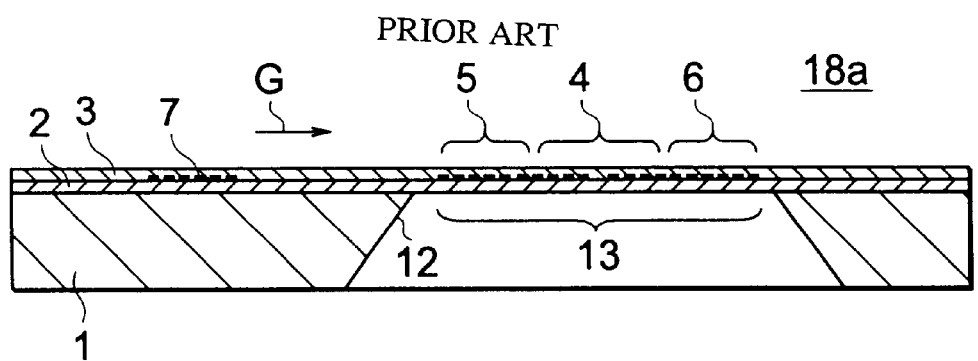
FIG. 21 is a side-elevational sectional view of the same taken along a line Y—Y in FIG. 20.

Incidentally, in FIGS. 1 and 2, parts or components described hereinbefore by reference to FIGS. 20 and 21 are denoted by like reference characters and thus repetitive description thereof will be omitted. In the case of the thermal-type flow sensor according to the instant embodiment of the invention, it is presumed that the flow rate detecting device 18A is implemented in a diaphragm type structure.

It should first be mentioned that in FIGS. 1 and 2, the individual parts constituting the flow rate detecting device 18A are shown in size differing from the actual dimensional ratio in order to facilitate understanding of the structure of the flow rate detecting device. Same holds true for the other figures.

Now, referring to FIGS. 1 and 2, formed on a base film 2 deposited on a top surface 1a of a plate-like substrate 1 are a heat generating resistor pattern 4, a reference resistor pattern 7, a temperature measuring resistor 14 and lead or conductor patterns 15a to 15f each of which is formed of a heat-sensitive resistance film (e.g. platinum) and all of which are covered with a protection film 3. The conductor patterns 15a to 15f form both terminals for the heat generating resistor pattern 4, the reference resistor pattern 7 and the temperature measuring resistor 14 for detecting heat generation, respectively.

The heat generating resistor pattern 4, the reference resistor pattern 7 and the temperature measuring resistor 14 are incorporated in a control circuit 50 (described hereinafter) of the thermal-type flow sensor, wherein a heating current i is supplied to the heat generating resistor pattern 4.

Further, applied to the reference resistor pattern 7 and the temperature measuring resistor 14 which constitute parts of a bridge circuit 25 is a constant voltage Vcc (a voltage of externally small magnitude) at which no spontaneous heat generation can take place in the temperature measuring resistor 14.

Formed at the ends of the lead or conductor patterns 15a to 15f are electrodes 16a to 16f, respectively, at which the protection film 3 on each of the conductor patterns is removed, whereby these conductor patterns are partially exposed.

The electrodes 16a to 16f are electrically connected to an external circuit (not shown) through wire bonding or the like process-known heretofore. Thus, the heat generating resistor pattern 4, the reference resistor pattern 7 and the temperature measuring resistor 14 are electrically connected to the external circuit mentioned above by way of the conductor patterns 15a to 15f and the electrodes 16a to 16f.

In the plate-like substrate 1, a cavity 12 of trapezoidal form extending from a bottom surface 1b of the substrate 1 to the base film 2 is formed by removing partially the material of the plate-like substrate 1, wherein a thin diaphragm 13A (low heat capacity portion) is formed in the cavity 12 in a structure integral with the plate-like substrate 1.

In the region of the diaphragm 13A, the heat generating resistor pattern 4 interposed or sandwiched between the base film 2 and the protection film 3 is held or supported by the plate-like substrate 1 along the whole peripheral portion of the diaphragm 13A.

The reference resistor pattern 7 is disposed on the plate-like substrate 1 at a position distanced from the diaphragm 13A. On the other hand, the temperature measuring resistor 14 is provided at a position internally of the heat generating resistor pattern 4 between stripe portions thereof and upstream of the vertical center axis of the flow rate detecting device 18A, as can clearly be seen from FIG. 1.

A bottom-surface protection film 19 is formed over the whole bottom surface 1b of the plate-like substrate 1, wherein an etched hole 20 is formed in the bottom-surface protection film 19 for forming the cavity 12.

Now, description will be directed to a process of manufacturing the flow rate detecting device 18A of the structure described above by reference to FIGS. 1 and 2.

In the first place, silicon nitride of 1 μm in thickness is deposited over the whole top surface 1a of the plate-like substrate 1 of 0.4 mm in thickness to thereby form the base film 2 by resorting to a sputtering or chemical vapor deposition (CVD) or the like method.

Subsequently, deposited over the whole top surface 1a of the plate-like substrate 1 having the base film 2 formed thereon is platinum in thickness of the 0.2 μm through a vapor deposition or sputtering or the like process, whereon patterning of the platinum film thus formed is carried out through photomechanical process, wet etching or dry etching method to thereby form the heat generating resistor pattern 4, the reference resistor pattern 7, the temperature measuring resistor 14 and the conductor patterns 15a to 15f.

In succession, the protection film 3 is formed over the whole top surface 1a of the plate-like substrate 1 by depositing silicon nitride in thickness of 1 μm by a sputtering or chemical vapor deposition (CVD) or the like method.

Thereafter, the end portions of the conductor patterns 15a to 15f, respectively, are exposed by removing the material from the corresponding regions of the protection film 3 through photomechanical process, wet etching or dry etching or the like process, to thereby form the electrodes 16a to 16f, respectively.

Subsequently, a resist is applied over the whole bottom surface 1b of the plate-like substrate 1 as the bottom-surface protection film 19, whereon the etched hole 20 is formed through photomechanical or the like process.

Finally, a portion of the plate-like substrate 1 is removed from the bottom surface 1b of the substrate 1 up to the base film 2 through e.g. alkali etching, to thereby form the diaphragm 13A.

As the etchant which can be used to this end, there may be mentioned KOH, TMAH (Tetra Methyl Ammonium Hydroxide), NaOH or the like.

In this conjunction, the diaphragm 13A should preferably be formed in a size of 1.5 mm×2 mm or so, while the size of a heat generating portion of the heat generating resistor pattern 4 should preferably be 0.8 mm×1 mm or so at the center portion of the diaphragm 13A. Further, the temperature measuring resistor 14 should preferably be realized in a size of 0.02 mm×1 mm or so at a position between pattern stripes of the heat generating resistor pattern 4 at the upstream side as viewed in the fluid flow direction.

Next, description will turn to the structure of a thermal-type flow sensor 100 in which the flow rate detecting device 18A implemented as described above is employed by reference to FIGS. 3 to 5, in which FIG. 3 is a front view showing the thermal-type flow sensor 100 according to a first embodiment of the present invention, FIG. 4 is a side elevational sectional view taken along a line B—B shown in FIG. 3 and FIG. 5 is a circuit diagram showing a control circuit 50 for the thermal-type flow sensor 100.

Figure 3:
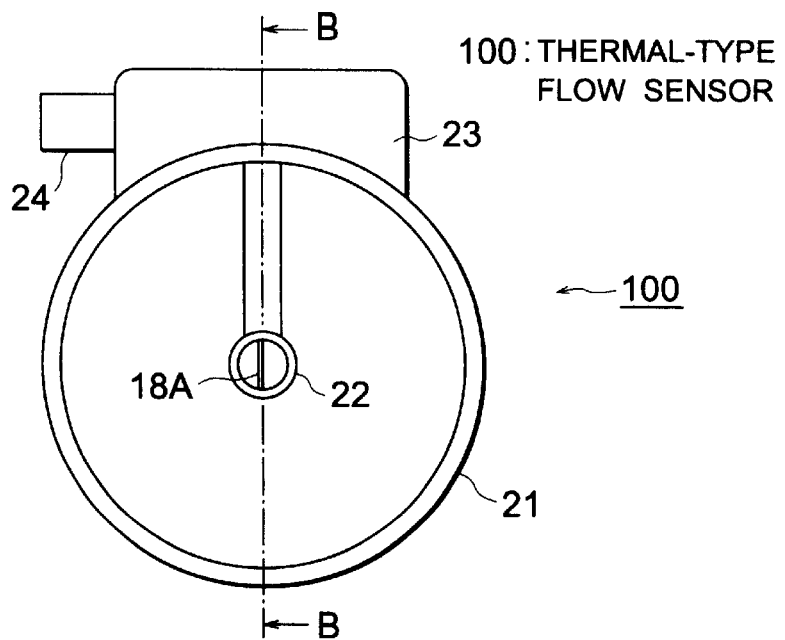
FIG. 3 is a front view showing the thermal-type flow sensor according to the first embodiment of the present invention.
Figure 4:
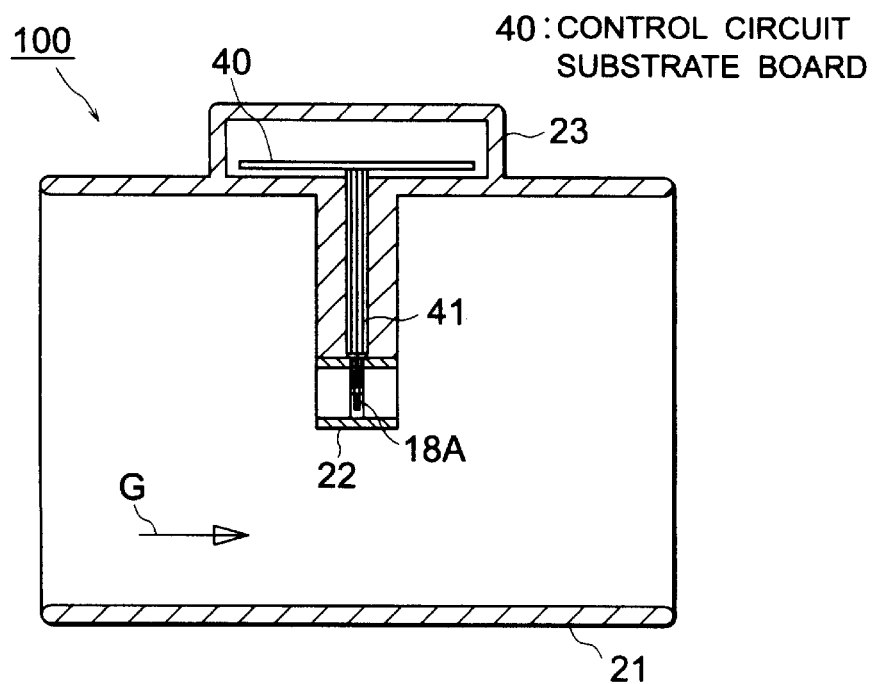
FIG. 4 is a side elevational sectional view taken along a line B—B shown in FIG. 3.

Referring to FIGS. 3 and 4, the thermal-type flow sensor 100 is comprised of a main passage 21 which serves as a passage for a measurement-destined fluid, a detecting pipe passage 22 disposed coaxially within the main passage 21, the flow rate detecting device 18A disposed within the detecting pipe passage 22, a case 23 formed in a structure integral with the main passage 21, a connector 24 for supplying electric power to the thermal-type flow sensor 100 while leading out the output power therefrom, a control circuit substrate board 40 accommodated within the case 23 and lead conductors 41 for electrically connecting the flow rate detecting device 18A to the control circuit on the substrate board 40.

The lead conductors 41 serve for electrically connecting the electrodes 16a to 16f (see FIG. 1) of the flow rate detecting device 18A to the control circuit on the substrate board 40.

The flow rate detecting device 18A is so disposed within the detecting pipe passage 22 that the top surface of the substrate 1 extends in parallel with the flow direction G of the measurement-destined fluid so as to be exposed to the measurement-destined fluid.

In this conjunction, it should be mentioned that the flow rate detecting device 18A may be embedded in a surface portion of a plate-like member (not shown) which in turn is disposed within the detecting pipe passage 22 so that the flow-rate detecting device 18A is disposed in such manner as mentioned above, with a view to stabilizing the ambient fluid flow.

On the other hand, the control circuit 50 of the thermal-type flow sensor 100 is composed of circuit elements of the flow rate detecting device 18A and those formed on the substrate board 40.

Figure 5:
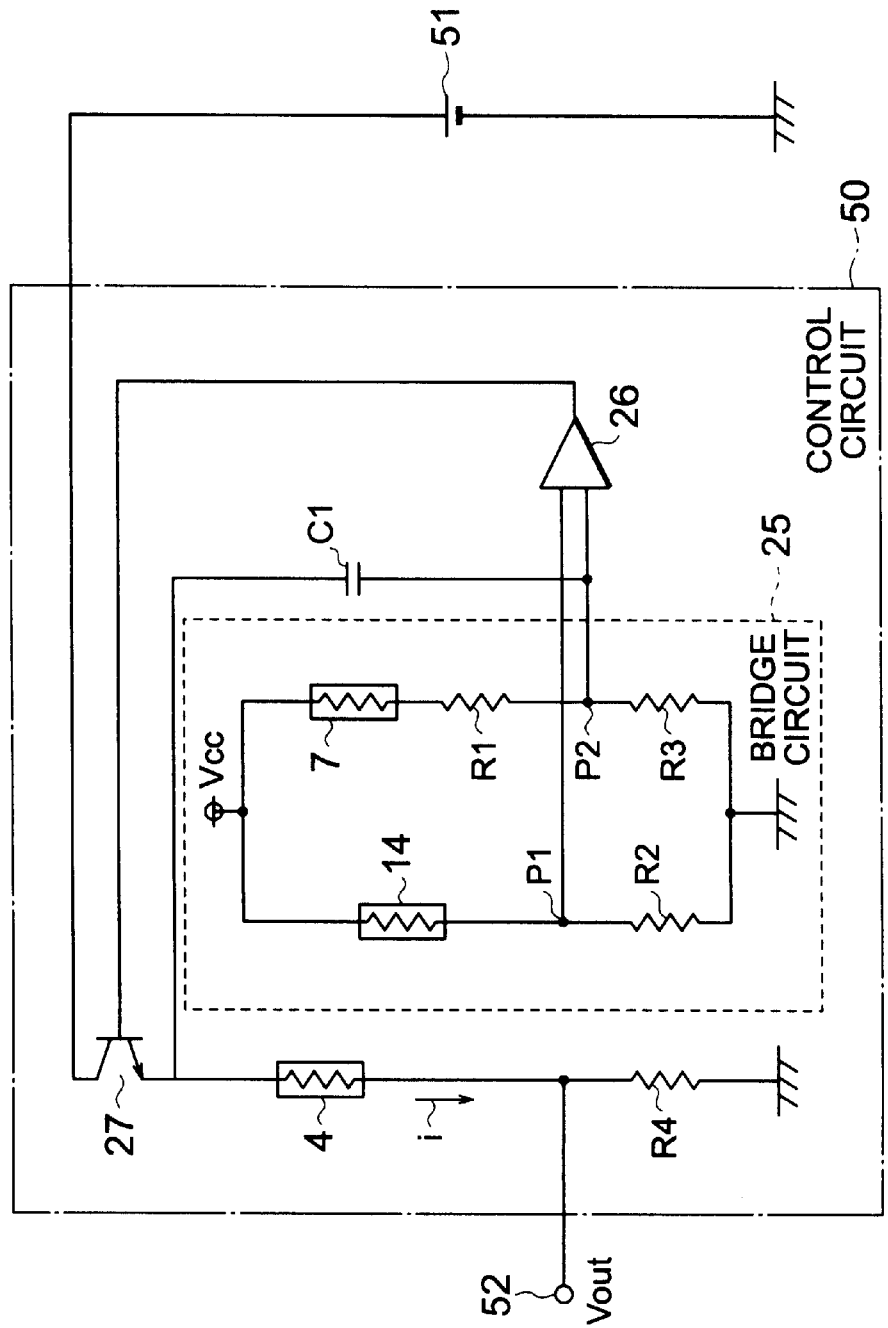
FIG. 5 is a circuit diagram showing a control circuit for the thermal-type flow sensor according to the first embodiment of the present invention.

In the control circuit 50 shown in FIG. 5, the circuit elements except for the heat generating resistor pattern 4, the reference resistor pattern 7 and the temperature measuring resistor 14 are mounted or packaged in the control circuit substrate board 40.

The control circuit 50 is comprised of a bridge circuit 25 for flow-rate detection, an operational amplifier 26 connected to the output terminal of the bridge circuit 25, a transistor 27 driven by the output voltage of the operational amplifier 26, the heat generating resistor pattern 4 and a fixed resistor R4 inserted between the emitter terminal of the transistor 27 and the ground, and a capacitor C1 inserted between the output terminal of the bridge circuit 25 and that of the transistor 27.

The bridge circuit 25 includes the temperature measuring resistor 14, the reference resistor pattern 7 and fixed resistors R1 to R3.

In the bridge circuit 25, there are inserted in parallel between the constant voltage Vcc and the ground potential a serial circuit composed of the temperature measuring resistor 14 and the fixed resistor R2 and a serial circuit composed of the reference resistor pattern 7 and the fixed resistors R1 and R3.

The electric potentials at the connecting points or junctions P1 and P2 of the above-mentioned serial circuits 25 represent a pair of input signals to the operational amplifier 26, respectively.

Applied to the collector of the transistor 27 is a voltage of plus polarity of a power-supply source 51 while applied to the base thereof is the output voltage of the operational amplifier 26 so that the heating current i supplied to the heat generating resistor pattern 4 can be regulated by the transistor 27. Further, the connecting point or junction between the heat generating resistor pattern 4 connected to the emitter of the transistor 27 and the fixed resistor R4 constitutes an output terminal 52 of the control circuit 50.

Figure 6:
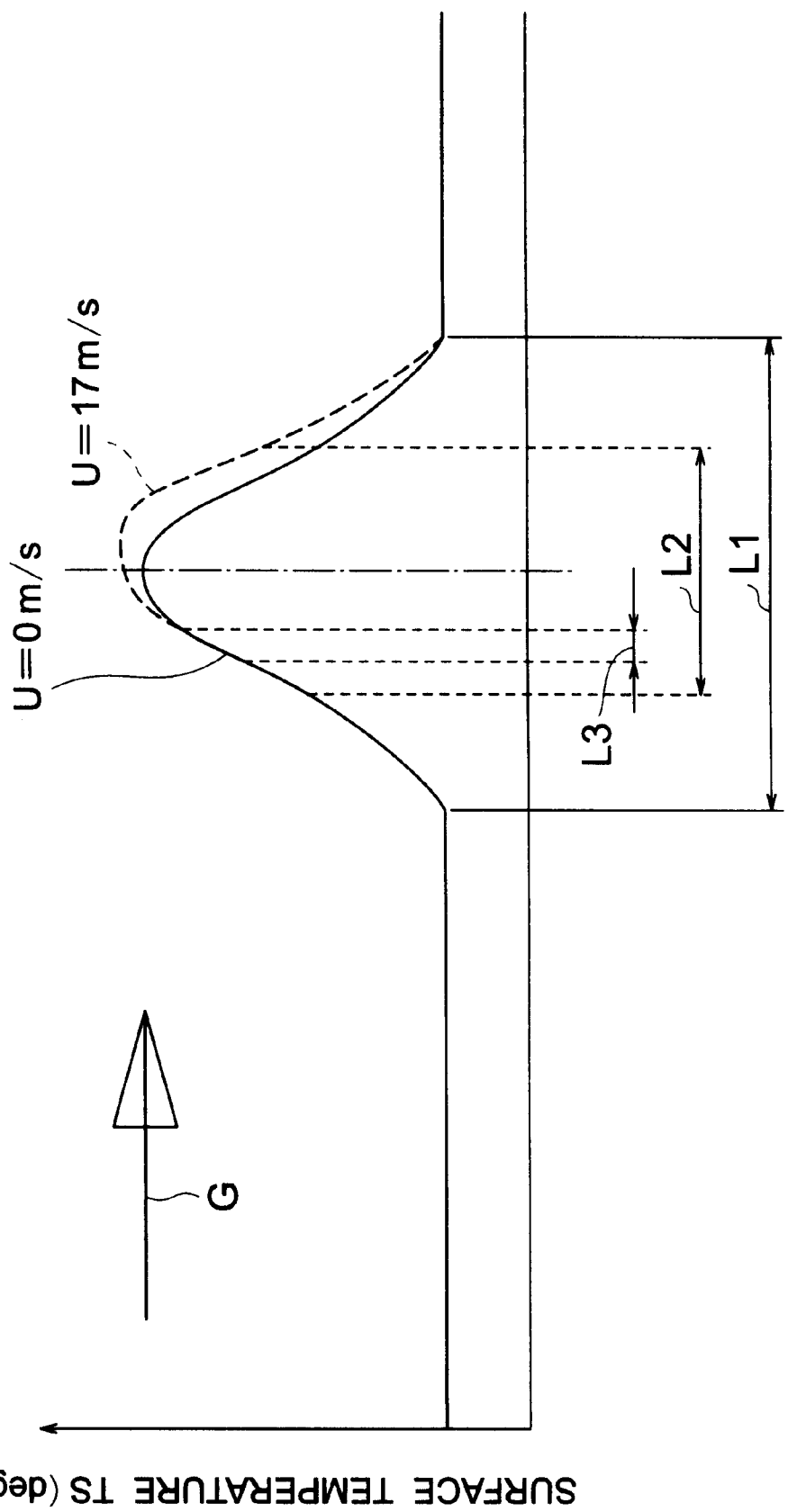
FIG. 6 is a view for graphically illustrating a distribution of surface temperature on a diaphragm as viewed in the flow direction of a fluid on the flow rate detecting device employed in the thermal-type flow sensor according to the first embodiment of the invention.
Figure 7:
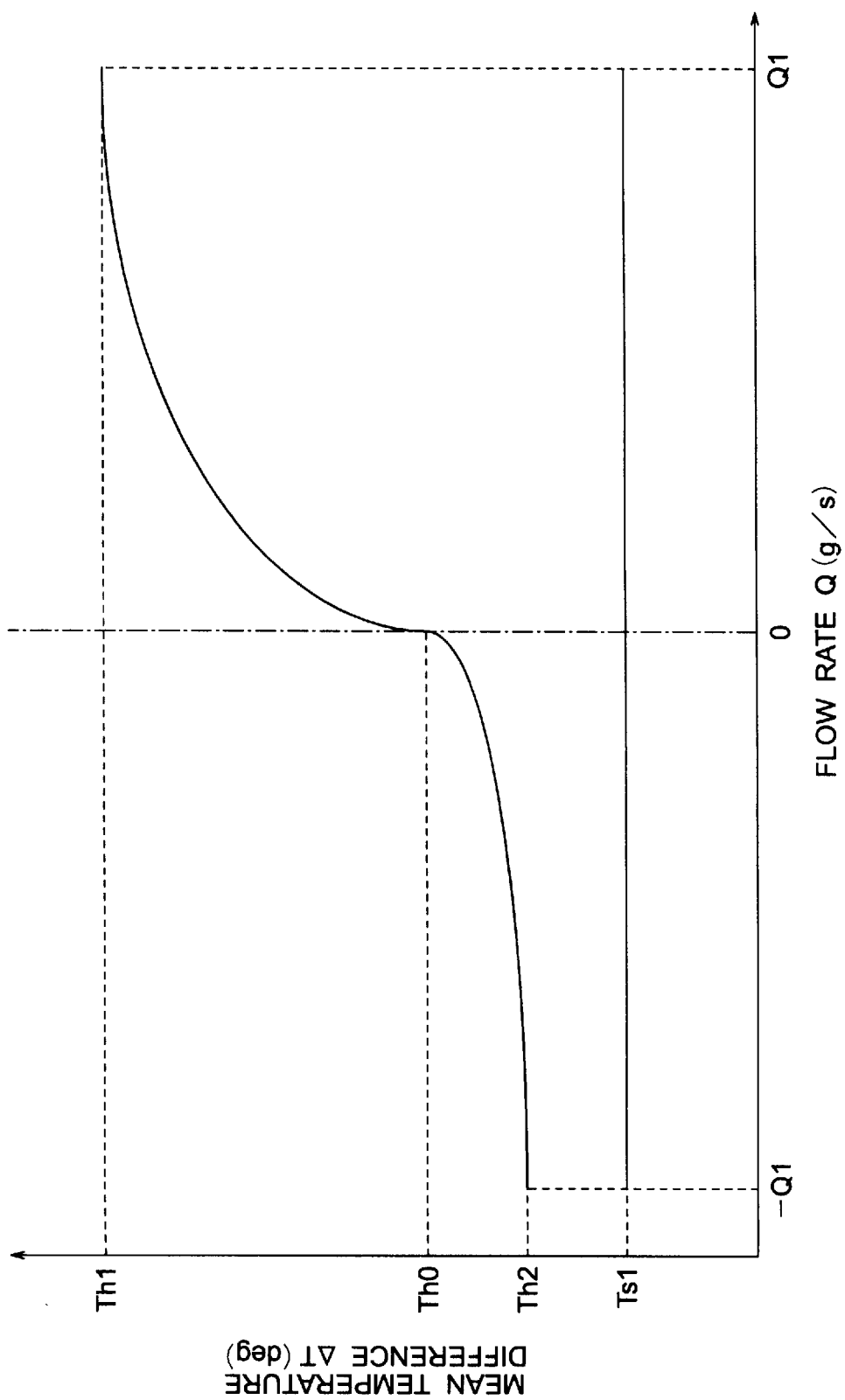
FIG. 7 is a characteristic diagram for illustrating graphically a relation between flow rate and a temperature in the operating state of the thermal-type flow sensor according to the first embodiment of the invention.
Figure 8:
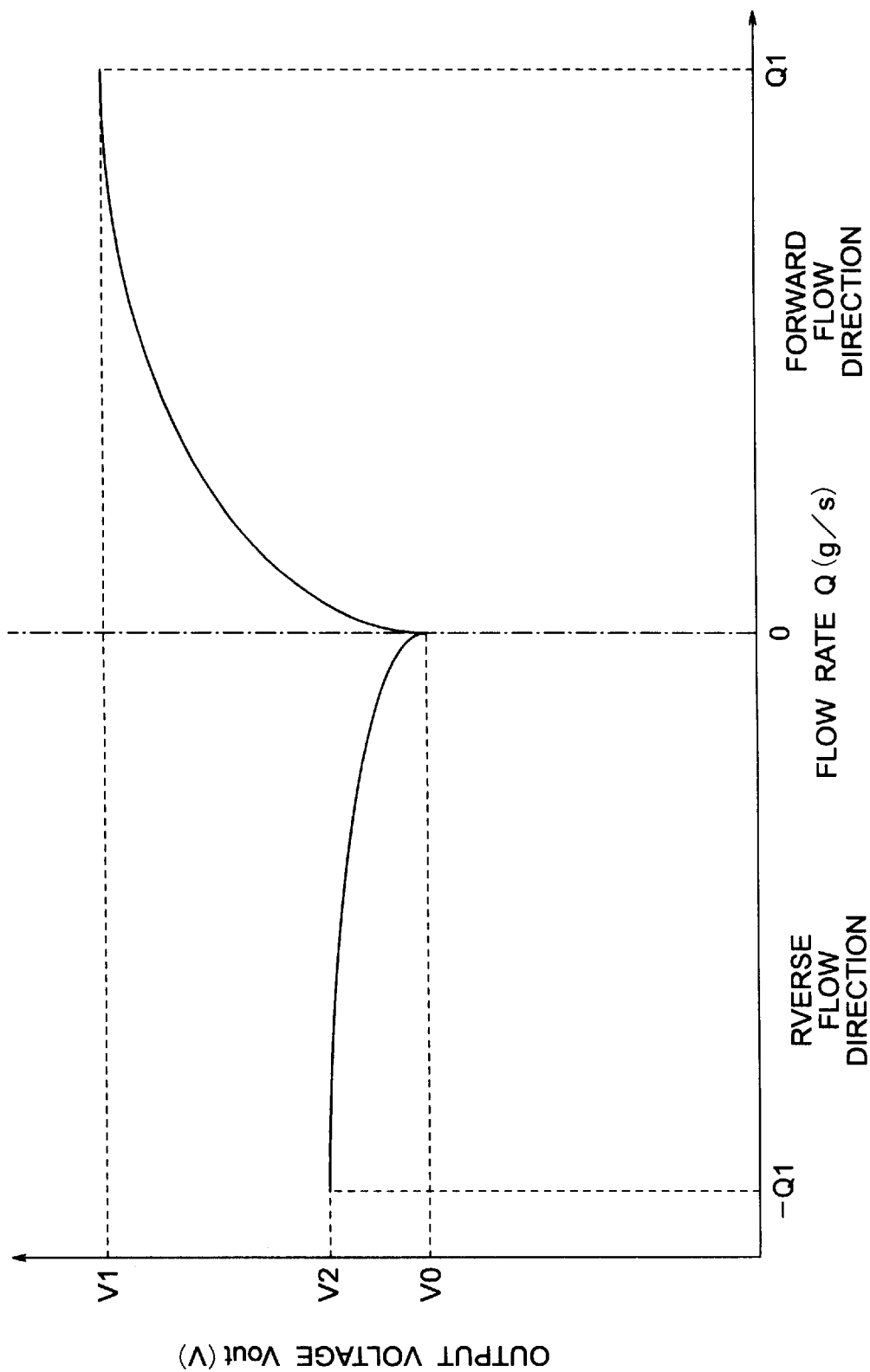
FIG. 8 is a characteristic diagram for illustrating graphically a relation between the flow rate in forward and reverse directions and the output signal voltage of the thermal-type flow sensor according to the first embodiment of the invention.
Figure 9:
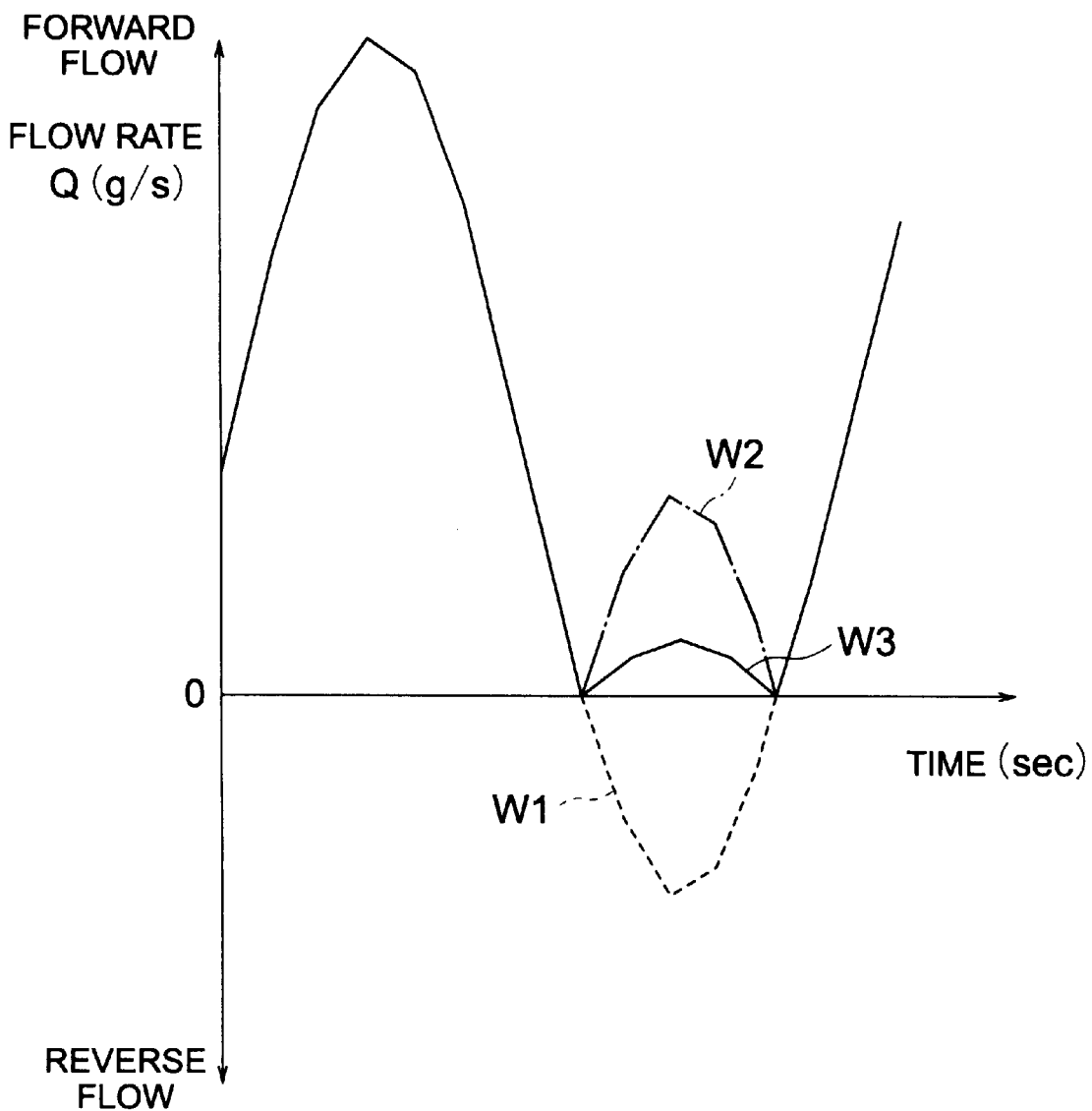
FIG. 9 is a view for illustrating graphically an output signal waveform of the thermal-type flow sensor according to the first embodiment of the invention upon occurrence of a pulsating flow phenomenon.

Next, description will be made of flow-rate detecting operation of the thermal-type flow sensor according to the first embodiment of the invention by reference to FIGS. 6 to 9 together with FIGS. 1 to 5, in which FIG. 6 is a view for graphically illustrating a distribution of surface temperature on the diaphragm as viewed in the flow direction G, FIG. 7 is a characteristic diagram for illustrating graphically a relation between the flow rate Q [g/s] and a mean temperature difference $\Delta T$ (deg) of the temperature in the operating state, FIG. 8 is a characteristic diagram for illustrating graphically a relation between the flow rate Q in forward and reverse directions and the output voltage Vout [V], and FIG. 9 is a view for illustrating graphically an output signal waveform upon occurrence of a pulsating flow phenomenon or event.

It is first to be noted that in the flow rate detecting device 18A, the reference resistor pattern 7 formed on the substrate 1 is disposed at the position distanced from the diaphragm 13A. Accordingly, heat generated by the heat generating resistor pattern 4 can not be conducted to the reference resistor pattern 7. Thus, the temperature detected at the reference resistor pattern 7 remains substantially equal to that of the fluid (measurement-destined object) flowing into the detecting pipe passage 22.

On the other hand, the temperature measuring resistor 14 constituting a part of the bridge circuit 25 is so controlled as to exhibit such a resistance value that a mean temperature (i.e., temperature on an average) of the temperature measuring resistor 14 is higher than that of the reference resistor pattern 7 by a predetermined temperature under the influence of the temperature of the heat generating resistor pattern 4 whose current is regulated by the control circuit 50.

In that case, the operational amplifier 26 incorporated in the control circuit 50 drives the transistor 27 so that the electric potentials at the junctions P1 and P2, respectively, become substantially equal to each other to thereby control the heating current i flowing through the heat generating resistor pattern 4.

Parenthetically, in FIG. 5, it is shown that the constant voltage Vcc is applied to the bridge circuit 25. It should however be noted that a constant current may be supplied to the bridge circuit 25.

Next, description will turn to the surface temperature distribution on the diaphragm 13A as viewed in the flow direction G.

In FIG. 6, there are illustrated distributions of the surface temperatures TS [deg] at a region L1 of the diaphragm 13A, a region L2 of the heat generating resistor pattern 4 and a region L3 of the temperature measuring resistor 14, respectively.

The distribution of the surface temperatures TS in the flow direction G is symmetrical relative to a center line (single-dotted broken line) of the region L2 of the heat generating resistor pattern 4, as illustrated by a solid line curve in FIG. 6, so long as no fluid flow takes place (i.e., when flow rate U=0 [m/s]).

On the other hand, when the flowing velocity of the fluid of concern increases in the forward flow direction G (e.g. when flow rate U=17 [m/s]), the peak level of the temperature distribution increases, as indicated by a broken curve in FIG. 6, while the peak position of the temperature distribution deviates or drifts to the downstream side from the center of the heat generating resistor pattern 4, as can be seen in FIG. 6.

In that case, the-temperature of the region L3 of the temperature measuring resistor 14 which is controlled to be constant becomes lower relative to the mean temperature mentioned previously, as a result of which the heating current i supplied to the heat generating resistor pattern 4 is caused to increase, whereby the temperature measuring resistor 14 is maintained at a temperature which is higher than the temperature of the reference resistor pattern 7 by a predetermined temperature.

Thus, by detecting the magnitude of the heating current i in terms of a voltage drop across the fixed resistor R3, i.e., the terminal voltage Vout of the fixed resistor R3 at the output terminal 52, the flowing velocity of the fluid or the flow rate of the fluid flowing through the passage having a predetermined cross-sectional area can be measured on the basis of the detection signal (i.e., flow rate measurement signal).

More specifically, representing the resistance value of the heat generating resistor pattern 4 (heating element) by RH, the mean temperature of the heat generating resistor pattern 4 by TH and the flow rate of a fluid flowing through a passage having a predetermined cross-suctional area by Q, relation given by the undermentioned expression (1) applies valid.

$$i^2 \times RH = (a + b \times Q^n) \times (TH - TA) \quad (1)$$

where a, b and n represent coefficients determined in dependence on geometrical configuration and structure arrangement of the flow rate detecting device 18A.

More specifically, the coefficient a represents a value corresponding to the amount or quantity of heat which does not depend on the flow rate Q. In other words, the coefficient a represents approximately a thermal conduction loss due to the heat conduction from the heat generating resistor pattern 4 to the substrate 1.

Further, the coefficient b represents a value which corresponds to the heat transfer by the forced convection and which may be set to 0.5 or so in dependence on the flow behavior of the fluid in the vicinity of the region of the heat generating resistor pattern 4.

Next, description will be directed to operation of the thermal-type flow sensor which depends on the flow rates in both the forward and backward flow directions of the fluid of concern by reference to FIG. 7 in which a mean temperature difference ΔT between the reference resistor pattern 7 and the heat generating resistor pattern 4 is illustrated as a function of the flow rate Q in both the forward and reverse flow directions.

As can be seen in FIG. 7, the curve representing the mean temperature difference ΔT (=TH−TA) assumes positive (plus) gradient or slop for incrementation of the flow rate in the forward flow direction G while assuming negative (minus) gradient or slope for the incrementation of the flow rate in the reverse flow direction (i.e., direction opposite to the direction G).

Thus, it can be said that the mean temperature difference ΔT between the mean temperature TH of the heat generating resistor pattern 4 and the temperature TA of the fluid exhibits dependency on the flow rate Q.

More specifically, the rate of change of the heating current i increases in dependence on the change of the flow rate Q in the forward flow direction G, which means that the detection sensitivity of the thermal-type flow sensor 100 can be enhanced when compared with the conventional thermal-type flow sensor in which the control is so performed that the temperature difference (TH−TA) remains constant, as described hereinbefore.

On the other hand, in the reverse flow direction, the rate of change of the heating current i decreases in dependence on the change of the flow rate Q, which means that the detection sensitivity of the thermal-type flow sensor 100 is lowered. Consequently, the detection sensitivity of the thermal-type flow sensor 100 lowers for the flow rate Q in the reverse flow direction, which means that the detection error can be suppressed when compared with the conventional thermal-type flow sensor.

FIG. 8 is a view for illustrating graphically the change of the output voltage Vout (heating current i) as a function of the change of the flow rate Q in the forward and reverse flow directions, respectively. As can be seen in FIG. 8, the rate of change of the output voltage Vout is high for the change of the flow rate Q in the forward flow direction while it is low in the reverse flow direction.

Next, description will turn to the flow-rate detecting operation of the thermal-type flow sensor in the case where pulsating flow phenomenon accompanied with the reverse flow occurs in an intake pipe of an internal combustion engine mounted on e.g. the motor vehicle.

In FIG. 9, a broken line curve W1 represents a flow-rate signal waveform of an actual reverse flow component, a single-dotted line curve W2 represents a flowrate signal waveform in the conventional thermal-type flow sensor described hereinbefore, and a solid line curve W3 represents a flow-rate signal waveform detected by the thermal-type flow sensor according to the instant embodiment of the present invention.

As described hereinbefore, in the case of the conventional thermal-type flow sensor, a sum of the flow rate Q in the reverse flow direction and the flow rate Q in the forward flow direction G is detected as the intake-air flow rate. Consequently, for the actual flow-rate signal waveform W1 (broken-line curve in FIG. 9) obtained in the reverse flow direction, the detection output of the conventional thermal-type flow sensor corresponds to the flow-rate signal waveform W2 (single-dotted line curve in FIG. 9) with only the polarity being inverted to the positive direction, whereby these makes appearance in the output of the conventional thermal-type flow sensor a flow-rate detection error which is substantially twice as large as the actual flow rate in the reverse direction.

By contrast, in the thermal-type flow sensor according to the instant embodiment of the present invention, the detection sensitivity thereof differs between the forward flow direction G and the reverse flow direction (see FIG. 8). Thus, by mapping previously (e.g. storing previously in the form of a table) the relation between flow rate Q in the forward flow direction G and the output voltage Vout, the flow-rate detection error ascribable to occurrence of the reverse flow can be reduced, as indicated by the flow-rate signal waveform W3 (solid-line curve shown in FIG. 9).

For the reasons mentioned above, when the thermal-type flow sensor according to the instant embodiment of the invention is employed as the flow sensor for detecting e.g. the intake-air flow rate in an internal combustion engine, the accuracy of fuel control for controlling the internal combustion engine on the basis of the intake-air flow rate can be enhanced significantly when compared with the control by resorting to the conventional thermal-type flow sensor.

Furthermore, because the temperature measuring resistor 14 is disposed internally of the heat generating resistor pattern 4 at a position upstream of the peak position in the temperature distribution making appearance in the fluid flow direction G under heat generation of the heat generating resistor pattern 4, the detection sensitivity of the thermal-type flow sensor 100 can be increased in the fluid forward flow direction G.

Besides, because the temperature measuring resistor 14 of the flow rate detecting device 18A is disposed internally of the heat generating resistor pattern 4 in such array as shown in FIG. 1, the temperature of the region at which the temperature measuring resistor 14 is disposed can not become lower than the mean temperature of the heat generating resistor pattern 4, even though the temperature measuring resistor 14 is disposed at the upstream side, as viewed in the forward flow direction G, as mentioned above.

Moreover, because the predetermined temperature mentioned previously can be ensured satisfactorily in the thermal-type flow sensor according to the instant embodiment of the invention, contamination due to deposition of moisture and dusts can positively be prevented. Thus, drift of the detection characteristics of the thermal-type flow sensor due to the contamination can be suppressed to a possible minimum, whereby accuracy of the flow-rate detection can be enhanced significantly.

Besides, in the diaphragm 13A, the temperature measuring resistor 14 formed of the heat-sensitive resistance film having a high heat transfer rate is peripherally enclosed by the heat generating resistor pattern 4 (see FIG. 1) and not interposed between the heat generating resistor pattern 4 and the substrate 1, degradation of the sensitivity of the thermal-type flow sensor according to the instant embodiment of the invention due to increasing of the quantity or amount of heat transferred to the substrate 1 can be suppressed.

In other words, the quantity of heat which is transferred from the heat generating resistor pattern 4 to the substrate 1 by way of the diaphragm 13A and which will incur heat loss plays essentially no role in the measurement of the flow rate. Accordingly, disposition of the temperature measuring resistor 14, being spatially isolated from the substrate 1 for the purpose of suppressing the loss due to heat conduction to the substrate 1, is very effective for enhancing and improving the flow-rate detection sensitivity of the thermal-type flow sensor.

Embodiment 2

In the case of the thermal-type flow sensor according to the first embodiment of the present invention, the temperature measuring resistor 14 is disposed at a position upstream of the center position of the heat generating resistor pattern 4 as viewed in the flow direction G in order to allow the temperature measuring resistor 14 to be disposed upstream of the peak position of the temperature distribution. However, the temperature measuring resistor 14 may be disposed substantially at the center position of the heat generating resistor pattern by imparting sparse/dense variation to the heat generating resistor pattern in respect to the stripe width thereof at both sides of the temperature measuring resistor 14.

In the following, the thermal-type flow sensor according to a second embodiment of the present invention will be described, in which the temperature measuring resistor 14 is disposed substantially at the center position of the heat generating resistor pattern and in which sparse/dense variation is imparted to the heat generating resistor pattern in respect to the stripe width thereof at both sides of the temperature measuring resistor.

Figure 10:
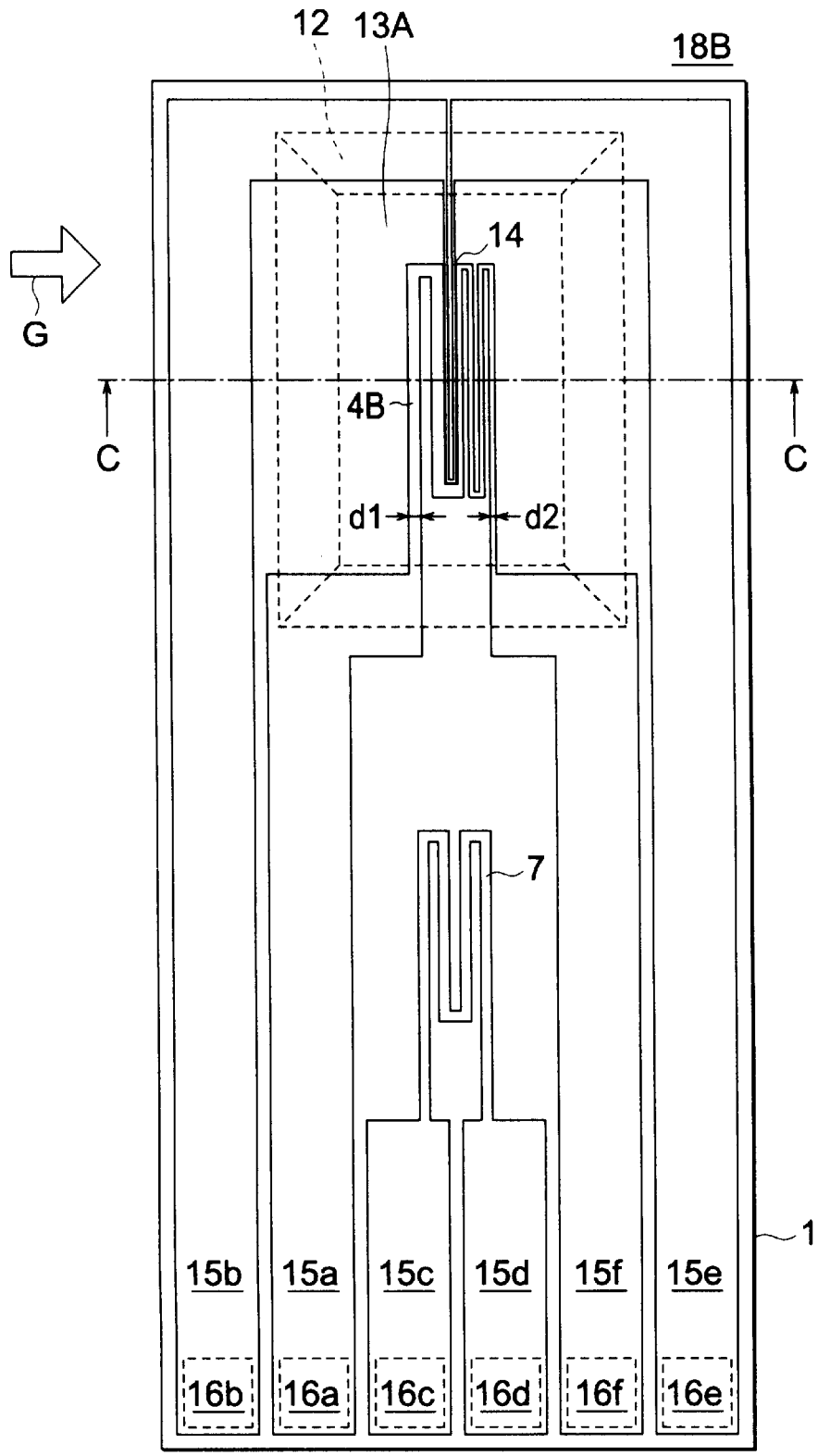
FIG. 10 is a top plan view showing a flow rate detecting device employed in a thermal-type flow sensor according to a second embodiment of the present invention, wherein the flow rate detecting device is shown in a state where a protection film is removed.
Figure 11:
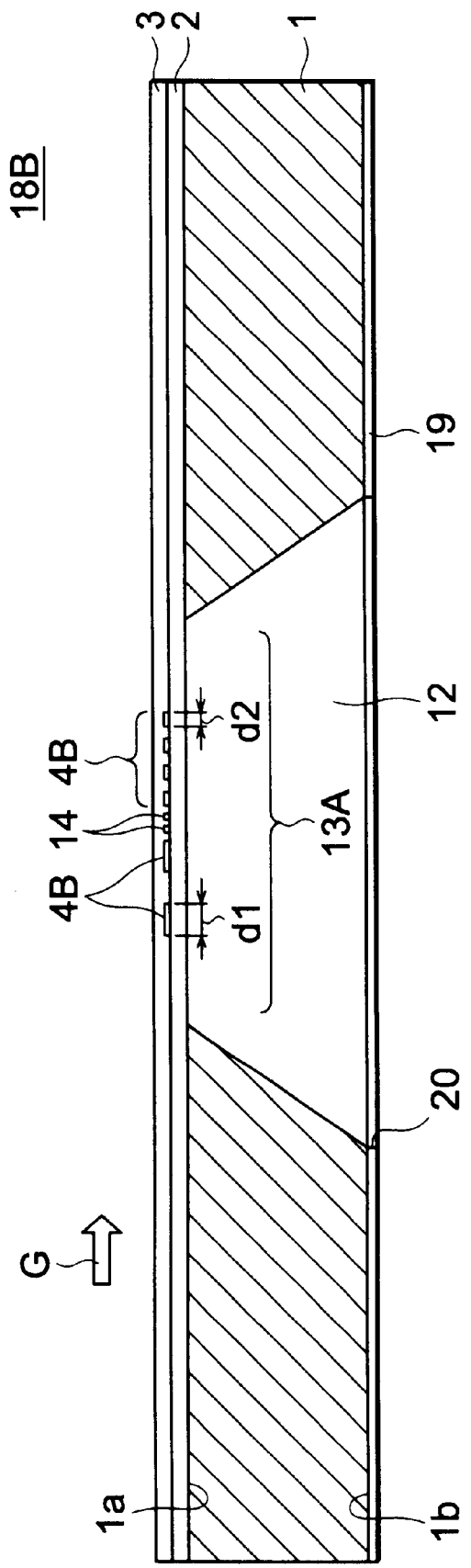
FIG. 11 is a side-elevational sectional view of the same taken along a line C—C in FIG. 10.

FIG. 10 is a top plan view showing a flow rate detecting device 18B employed in the thermal-type flow sensor according to the second embodiment of the invention, wherein the flow rate detecting device 18B is shown in a state where the protection film 3 is removed, and FIG. 11 is a side-elevational sectional view of the same taken along a line C—C in FIG. 10.

Incidentally, in FIGS. 10 and 11, parts or components described hereinbefore by reference to FIGS. 1 and 2 are denoted by like reference characters and thus repetitive description thereof will be omitted.

As can be seen in FIGS. 10 and 11, the temperature measuring resistor 14 of a flow rate detecting device 18B is disposed substantially at a center portion of the heat generating resistor pattern 4B as viewed in the fluid flow direction G. Further, it can be seen that in a portion or region of the heat generating resistor pattern 4B upstream of the temperature measuring resistor 14, the pattern stripe width d2 of the heat generating resistor pattern 4B is sized smaller than that of the pattern stripe width d1 in the downstream region. To say in another way, in the downstream region mentioned above, the heat generating resistor pattern 4B is realized with a high density when compared with the pattern in the upstream region.

At this juncture, it should first be mentioned that the structure of the flow rate detecting device 18B for the thermal-type flow sensor according to the second embodiment of the invention is substantially same as that of the flow rate detecting device according to the first embodiment except for the positions of the conductor patterns 15a and 15b, the positions of the conductor patterns 15e and 15f, the positions of the electrodes 16a and 16b, and the positions of the electrodes 16e and 16f relative to the disposition of the temperature measuring resistor 14, as can readily be understood by comparing the arrangement shown in FIG. 10 with that shown in FIG. 1.

By imparting the sparse/dense variation to the heat generating resistor pattern 4B such that the downstream pattern stripe width d2 is narrower than the downstream pattern stripe width d1 with reference to a boundary defined by the stripe temperature measuring resistor 14 located at the center portion of the flow-rate detecting device 18B, as shown in FIGS. 10 and 11, disposition of the temperature measuring resistor 14 internally of the heat generating resistor pattern 4B at the center portion thereof and hence of the flow rate detecting device 18B is in effect equivalent to the disposition of the temperature measuring resistor 14 upstream of the peak position of the temperature distribution. This can be explained by the fact that when the temperature distribution at both sides of the temperature measuring resistor 14 in the fluid flow direction G is considered, the temperature of the heat generating resistor pattern 4B in the downstream region where the pattern is dense and thus the resistance value is high becomes higher than that in the upstream region so long as no flow takes place (i.e., when the flow rate Q is zero), whereby the peak position of the temperature is shifted downstream.

Thus, by setting the relation between the stripe widths d1 and d2 of the heat generating resistor pattern at both sides of the temperature measuring resistor 14 such that the condition d1>d2 can be satisfied, it is no more necessary to dispose the temperature measuring resistor 14 at the position upstream of the center portion of the heat generating resistor pattern 4B as viewed in the flow direction G. In this way, no restriction is imposed so long as the disposition of the temperature measuring resistor 14 is concerned, whereby there can be ensured a high degree of freedom for design.

Besides, owing to the possibility of changing the temperature distribution in accordance with sparsity/density of the heat generating resistor pattern 4B, desired characteristic can be realized with regard to the change of the temperature due to heat generation which is determined by the positional relation between the heat generating resistor pattern 4B and the temperature measuring resistor 14. Thus, the degree of freedom in design concerning disposition of the heat generating resistor pattern 4B and the temperature measuring resistor 14 can further be increased.

Furthermore, by disposing the temperature measuring resistor 14 at the center portion of the heat generating resistor pattern 4B, the whole pattern disposition on and over the diaphragm 13A can be realized substantially symmetrically on a single plane, whereby undesirable mechanical deformation of the diaphragm 13A which may otherwise occur under the influence of heating can be suppressed, to additional advantage.

At this juncture, it should be mentioned that although the temperature measuring resistor 14 is disposed at the center portion of the thermal heat generating resistor pattern 4B in the flow rate detecting device 18B according to the second embodiment of the invention, no restriction is imposed as to the position of the temperature measuring resistor 14. It goes without saying that so long as the temperature measuring resistor 14 is located upstream of the peak position of the temperature distribution, as described hereinbefore, the temperature measuring resistor 14 may be disposed at a given position internally of the heat generating resistor pattern 4B.

Embodiment 3

In the case of the flow rate detecting device according to the second embodiment of the invention, the heat generating resistor pattern 4B located downstream of the temperature measuring resistor 14 is formed dense (so as to increase the resistance value) with a view to shifting the peak position of the temperature distribution downstream in the fluid flow direction G. However, substantially same effect can be obtained by reducing the pattern thickness in the region of the heat generating resistor pattern located downstream of the temperature measuring resistor 14 (so as to increase the resistance value). A third embodiment of the present invention is directed to the flow rate detecting device in which the thickness of the heat generating resistor pattern is varied or differentiated at both sides of the temperature measuring resistor 14.

In the following, the thermal-type flow sensor according to a third embodiment of the present invention will be described, in which the heat generating resistor pattern is varied in respect to the thickness thereof at both sides of the temperature measuring resistor 14.

Figure 12:
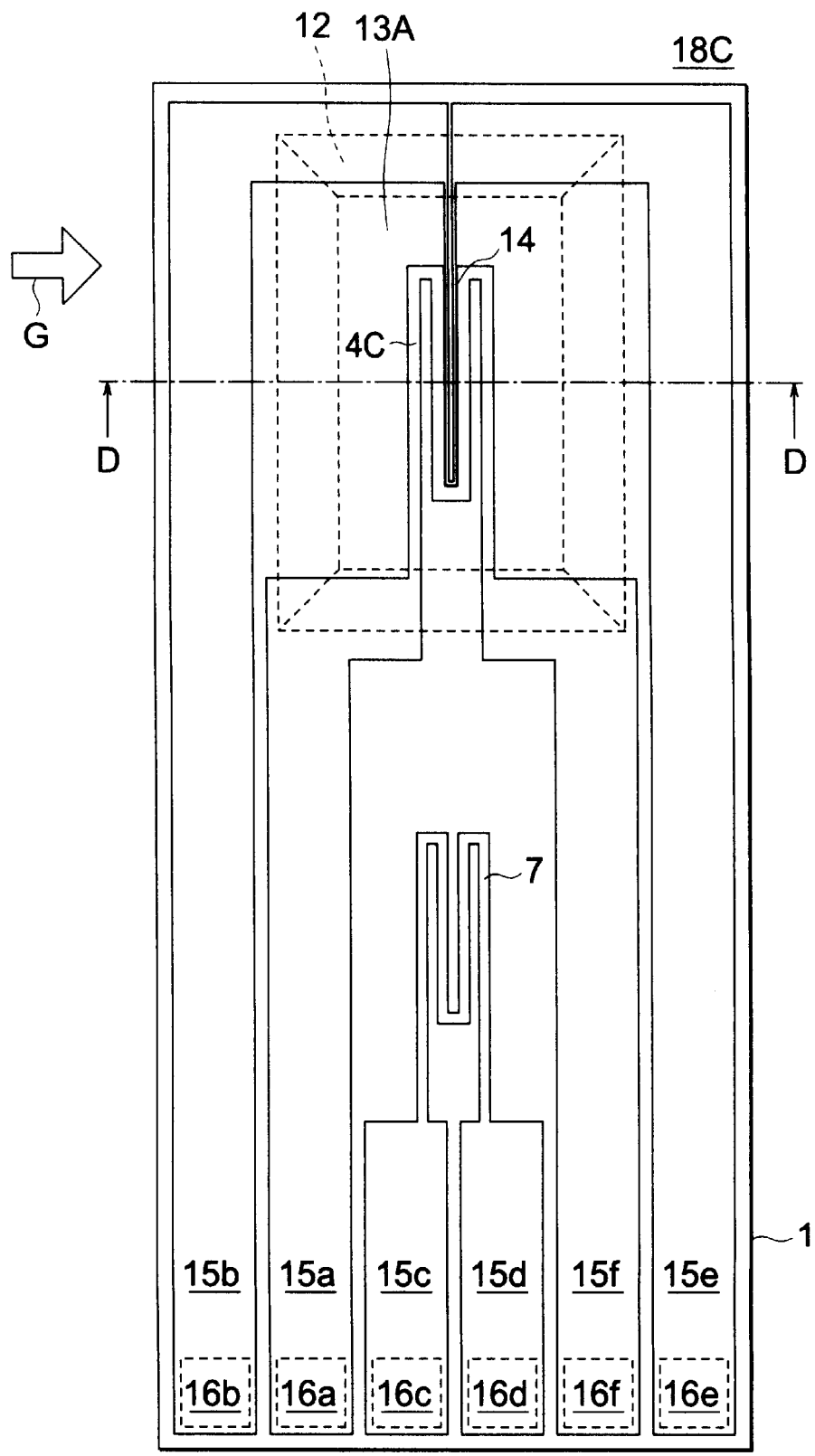
FIG. 12 is a top plan view showing a flow rate detecting device employed in a thermal-type flow sensor according to a third embodiment of the present invention, wherein the flow rate detecting device is shown in a state where a protection film is removed.
Figure 13:
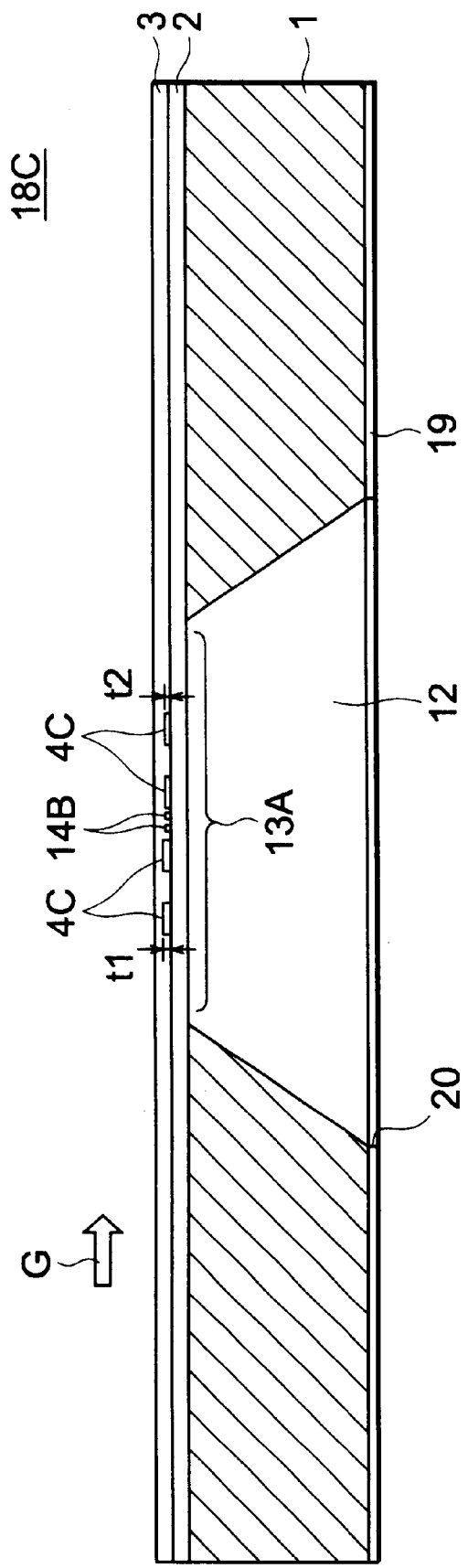
FIG. 13 is a side-elevational sectional view of the same taken along a line D—D in FIG. 12.

FIG. 12 is a top plan view showing a flow rate detecting device 18C employed in the thermal-type flow sensor according to the third embodiment of the invention, wherein the flow rate detecting device 18C is shown in a state where the protection film 3 is removed, and FIG. 13 is a side-elevational sectional view of the same taken along a line D—D in FIG. 12.

Referring to FIGS. 12 and 13, the temperature measuring resistor 14 of the flow rate detecting device 18C is disposed internally of a heat generating resistor pattern 4C at a center portion thereof, as in the case of the thermal-type flow sensor according to the second embodiment described previously by reference to FIGS. 10 and 11. In this conjunction, it should however be noted that the region of the heat generating resistor pattern 4C located downstream of the temperature measuring resistor 14 has a pattern thickness t2 which is thinner than the pattern thickness t1 in the upstream region.

With the arrangement of the heat generating resistor pattern 4C, the resistance value thereof is greater in the region downstream of the temperature measuring resistor 14 when compared with the resistance value in the region upstream of the temperature measuring resistor 14, as in the case of the thermal-type flow sensor according to the second embodiment described previously by reference to FIGS. 10 and 11.

By setting the thicknesses t1 and t2 of the heat generating resistor pattern 4C at both sides of the temperature measuring resistor 14 such that the condition t1>t2 can be satisfied, the temperature due to heat generation in the region of the heat generating resistor pattern 4C located downstream of the temperature measuring resistor 14 becomes higher than that in the upstream region of the heat generating resistor pattern. Thus, in the state where no fluid flow occurs within the thermal-type flow sensor, the peak position of the temperature distribution on the heat generating resistor pattern 4C is shifted downstream.

Thus, even when the temperature measuring resistor 14 is disposed internally of the heat generating resistor pattern 4C at the center portion thereof, the temperature measuring resistor 14 will be effectively disposed at a location upstream of the peak position of the temperature distribution on the heat generating resistor pattern 4C, which means that substantially no restriction is imposed on the position or disposition of the temperature measuring resistor 14. Additionally, by changing the temperature distribution in accordance with the pattern thicknesses t1 and t2 of the heat generating resistor pattern, the thermal-type flow sensor having desired flow-rate detection characteristics can be realized.

Embodiment 4

In the case of the thermal-type flow sensors according to the second and third embodiments of the invention described above, the resistance value of the region or portion of the heat generating resistor pattern downstream of the temperature measuring resistor is set greater than that of the upstream-side portion with a view to shifting the peak position of the distribution of heat temperature downstream as viewed in the fluid flow direction. It should however be mentioned that substantially similar effect can be achieved by shifting the position of the heat generating resistor pattern relative to the diaphragm 13A.

In the following, the thermal-type flow sensor according to a fourth embodiment of the present invention will be described, in which the position of the heat generating resistor pattern is shifted relative to the diaphragm 13A.

Figure 14:
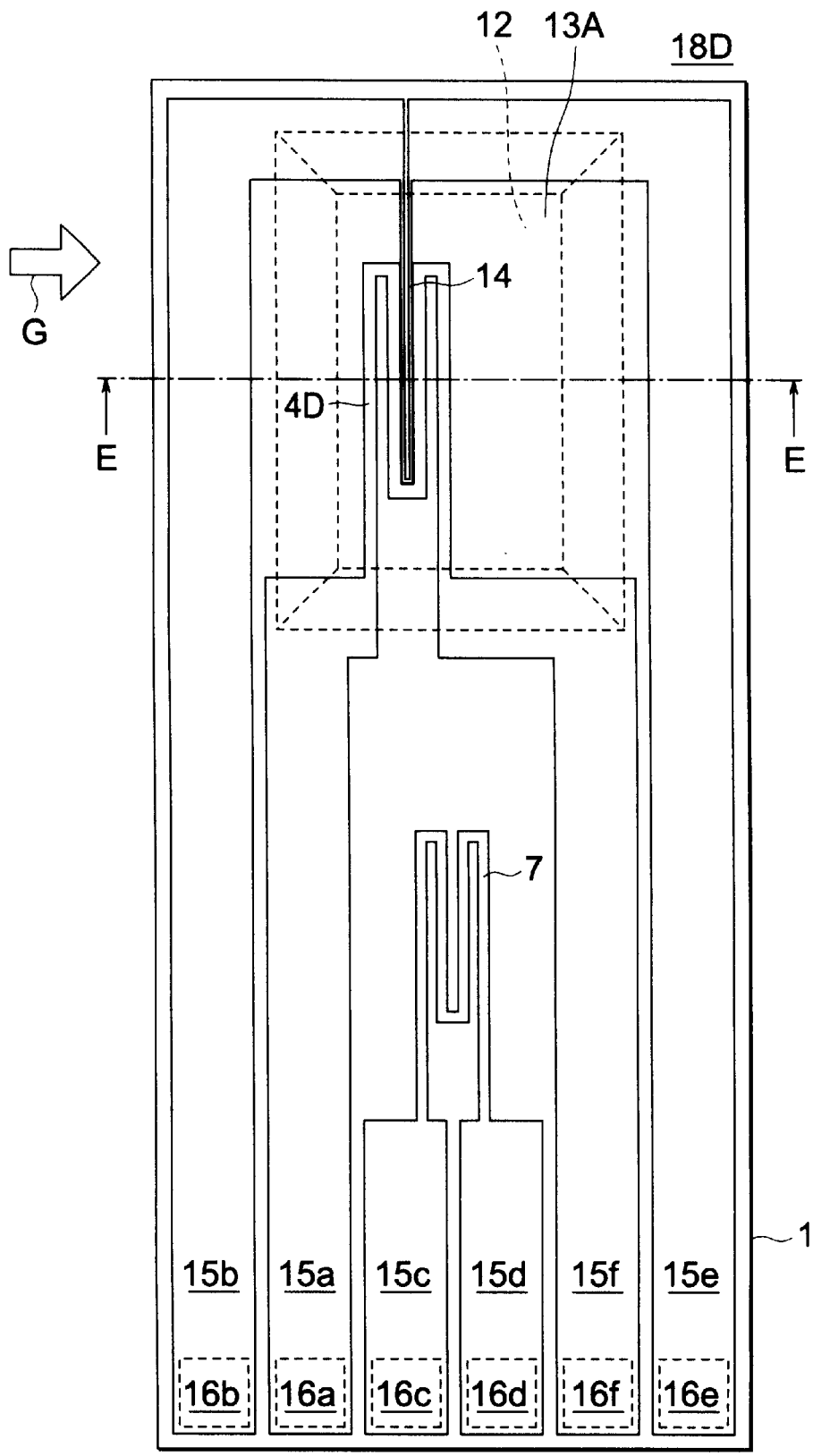
FIG. 14 is a top plan view showing a flow rate detecting device employed in a thermal-type flow sensor according to a fourth embodiment of the present invention, wherein the flow rate detecting device is shown in a state where a protection film is removed.
Figure 15:
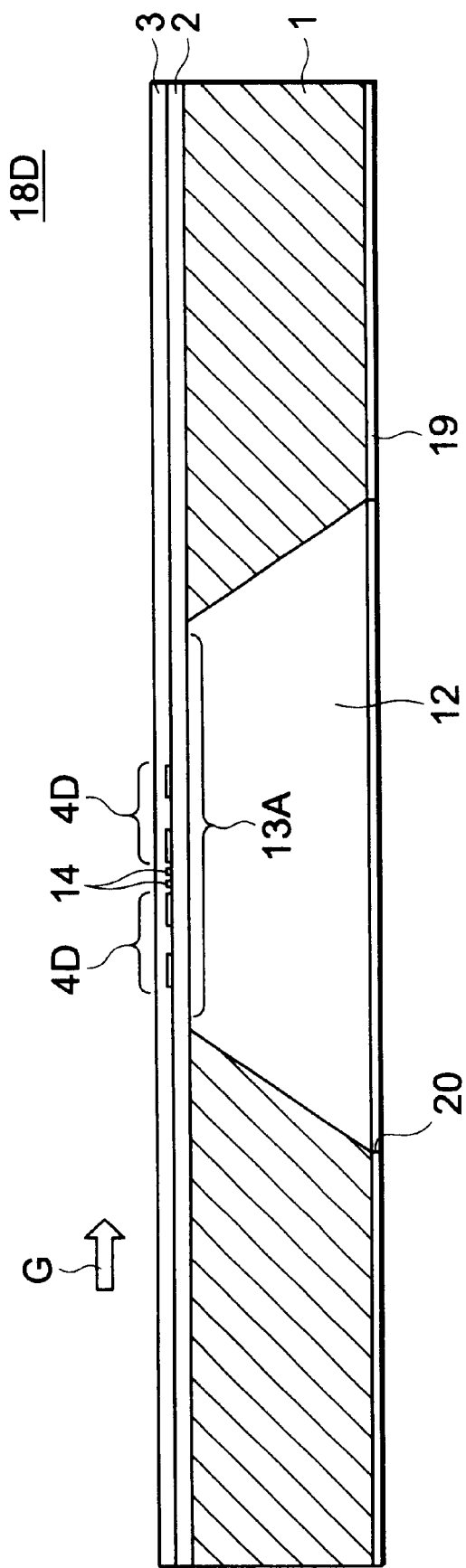
FIG. 15 is a side-elevational sectional view of the same taken along a line E—E in FIG. 14.

FIG. 14 is a top plan view showing a flow rate detecting device 18D employed in the thermal-type flow sensor according to the fourth embodiment of the invention, wherein the flow rate detecting device 18D is shown in a state where the protection film 3 is removed, and FIG. 15 is a side-elevational sectional view of the same taken along a line E—E in FIG. 14.

Referring to FIGS. 14 and 15, the temperature measuring resistor 14 is disposed internally of a heat generating resistor pattern 4D at a center portion thereof, as in the case of the thermal-type flow sensor according to the second embodiment described previously by reference to FIGS. 12 and 13.

On the other hand, the heat generating resistor pattern 4D is disposed, being shifted upstream of the center portion of the diaphragm 13A.

By shifting the position of the heat generating resistor pattern 4D upstream relative to the diaphragm 13A, the distance from the heat generating resistor pattern 4D to the substrate 1 is shortened in the upstream region when compared with the distance in the downstream region.

Thus, heat generated by the heat generating resistor pattern 4D is more easy to conduct to the substrate 1 with conduction loss increasing in the upstream region of the heat generating resistor pattern 4D than in the downstream region thereof. In other words, the temperature distribution on the heat generating resistor pattern 4D due to heat generation thereof assumes such profile that the temperature becomes low in the upstream region.

Thus, the peak position of the temperature distribution on the heat generating resistor pattern 4D in the state where no fluid flow exists is shifted downstream, which means that essentially no restriction is imposed on the position or disposition of the temperature measuring resistor 14 relative to the fluid flow direction G, as in the case of the thermal-type flow sensors described hereinbefore.

Furthermore, because the temperature distribution can vary in dependence on the position of the heat generating resistor pattern 4D, desired characteristics of the thermal-type flow sensor can be realized.

Embodiment 5

In the case of the flow rate detecting device of the thermal-type flow sensor according to the first embodiment of the invention, only the temperature measuring resistor 14 is disposed internally of the heat generating resistor pattern 4 at a position upstream of the center portion thereof. According to the teaching of the invention incarnated in a fifth embodiment thereof, it is proposed that a dummy pattern is additionally disposed at a position downstream of the heat generating resistor pattern 4 so that the dummy pattern is disposed symmetrically to the temperature measuring resistor 14 with a view to suppressing mechanical deformation which may occur under the influence of heat generation.

In the following, a thermal-type flow sensor according to the fifth embodiment of the present invention will be described, in which the dummy pattern is disposed symmetrically to the temperature measuring resistor 14.

Figure 16:
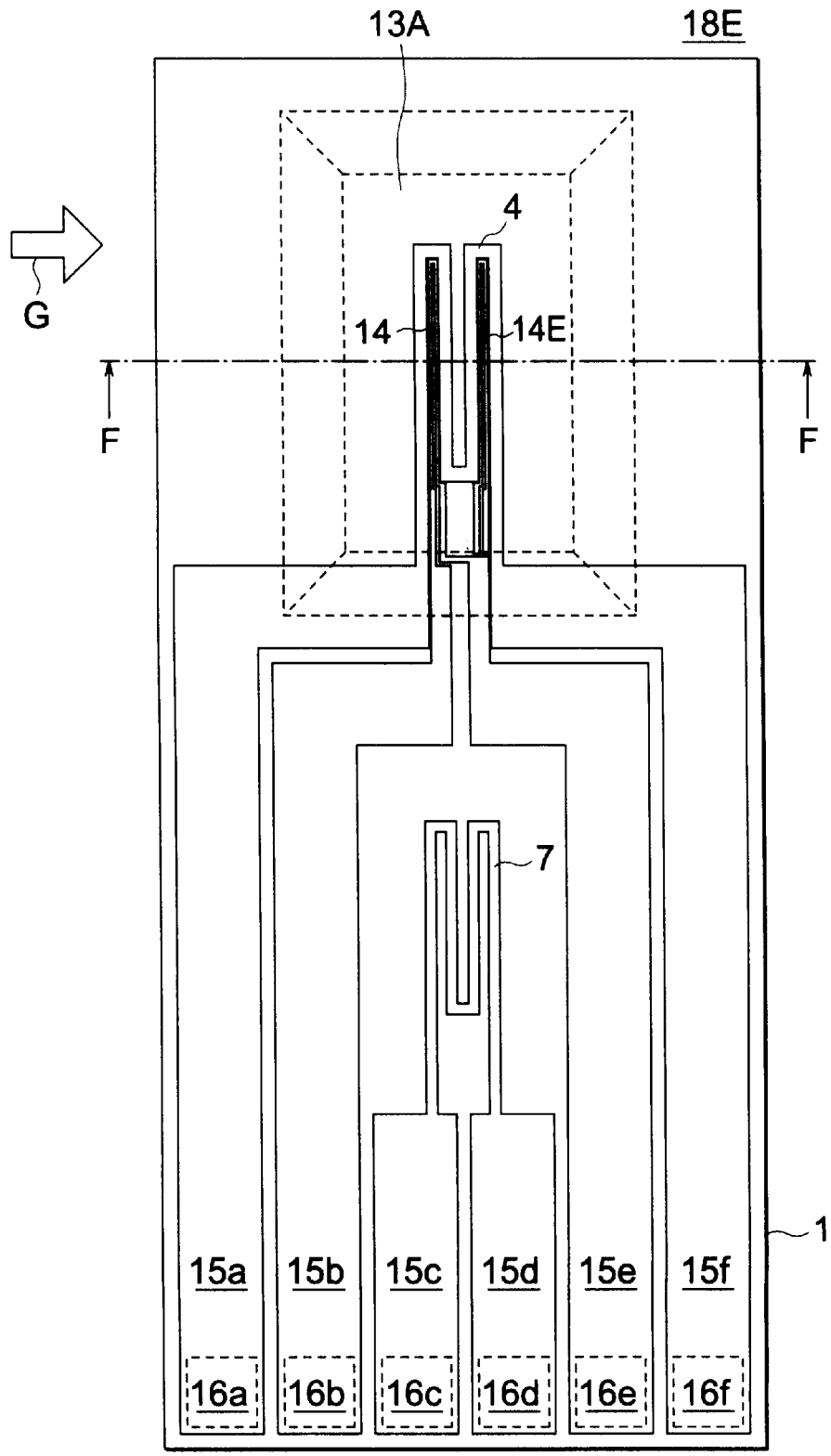
FIG. 16 is a top plan view showing a flow rate detecting device employed in a thermal-type flow sensor according to a fifth embodiment of the present invention, wherein the flow rate detecting device is shown in a state where a protection film is removed.
Figure 17:
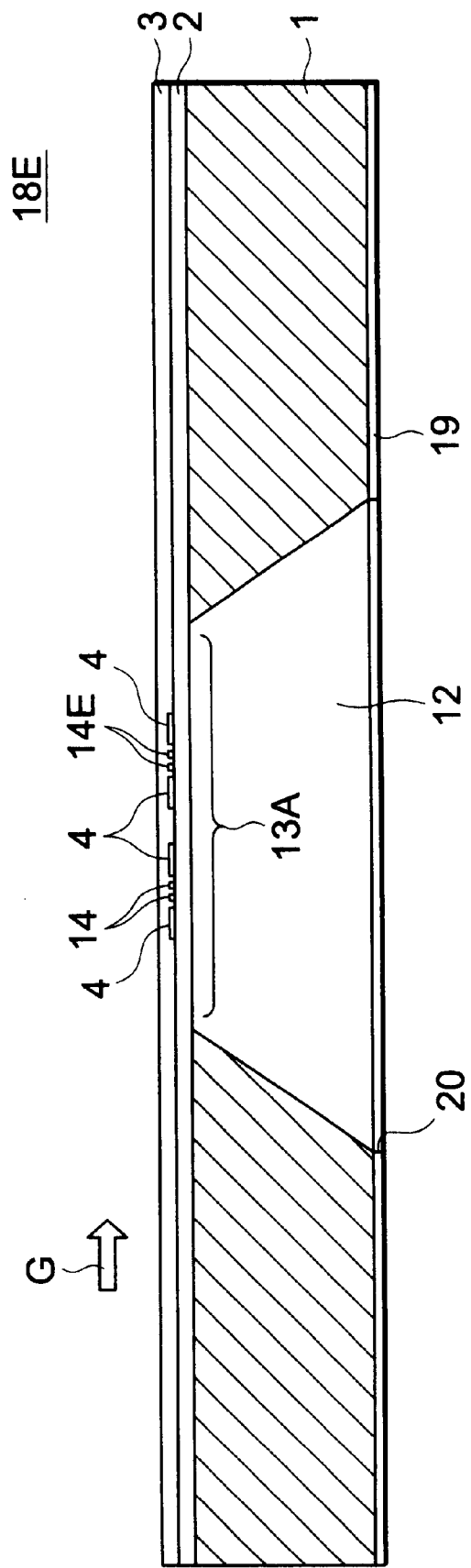
FIG. 17 is a side-elevational sectional view of the same taken along a line F—F in FIG. 16.
Figure 18:
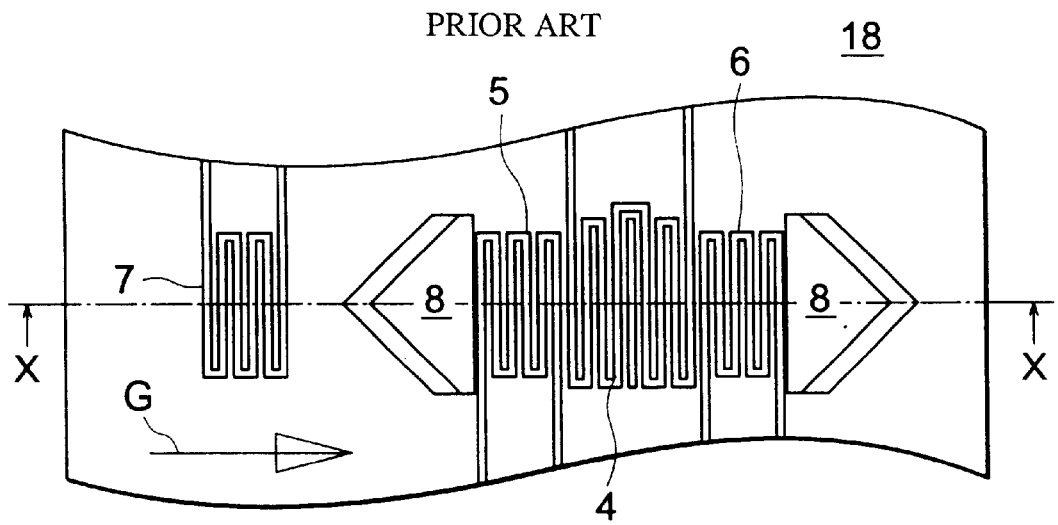
FIG. 18 is a top plan view showing a bridge type flow rate detecting device employed in a conventional thermal-type flow sensor, wherein the flow rate detecting device is shown in a state where a protection film is removed.
Figure 19:
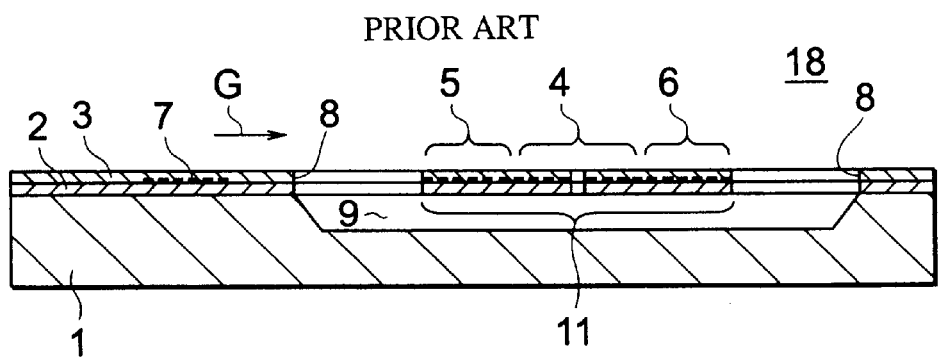
FIG. 19 is a side-elevational sectional view of the same taken along a line X—X in FIG. 18.

FIG. 16 is a top plan view showing a flow rate detecting device 18E employed in the thermal-type flow sensor according to the fifth embodiment of the invention, wherein the flow rate detecting device 18E is shown in a state where the protection film 3 is removed, and FIG. 17 is a side-elevational sectional view of the same taken along a line F—F in FIG. 16.

Referring to FIGS. 16 and 17, the temperature measuring resistor 14 of the flow rate detecting device 18E is disposed at a position upstream of a heat generating resistor pattern 4, as in the case of the thermal-type flow sensor according to the first embodiment described previously by reference to FIGS. 1 and 2.

On the other hand, the dummy pattern 14E which is not electrically energized (i.e., to which no current is fed) is disposed at a symmetrical position relative to the temperature measuring resistor 14, as viewed along a plane of the diaphragm 13A.

Parenthetically, the dummy pattern 14E is provided with neither lead or conductor pattern nor the electrode and disposed internally of the heat generating resistor pattern 4 at a position downstream thereof.

In general, the diaphragm 13A has portions or regions where no pattern exists, as viewed in the direction thicknesswise of the diaphragm and portions or regions where the pattern exists. Consequently, there is a possibility that mechanical deformation may take place under the influence of heat being generated.

However, by forming the dummy pattern 14E at a position symmetrical to the temperature measuring resistor 14 on the plane of diaphragm 13A, as shown in FIGS. 16 and 17, it is possible to suppress the deformation of the diaphragm 13A which may otherwise occur due to difference of inner stress and mechanical or thermal property between the silicon nitride films constituting the base film 2 and the protection film 3 and the heat-sensitive resistance film (e.g. platinum film) which constitutes the pattern.

In this manner, deformation of the diaphragm 13A can be suppressed to a minimum while the deformation can be made symmetrical and simple-notwithstanding the fact whether the electric current is fed to the heat generating resistor pattern 4 or not, whereby there can be realized the thermal-type flow sensor which assures improved reproductiveness and reliability.

Besides, since the mechanical deformation, if occurs, is geometrically symmetrized (i.e., reduced to simple deformed shape), stress making appearance among the individual films due to the mechanical deformation can be reduced, whereby inter-film delamination can satisfactorily be prevented.

Additionally, because the mechanical deformation is suppressed while being geometrically symmetrized and because dispersion in magnitude of the deformation occurring upon feeding of electric current to the heat generating resistor pattern 4 is suppressed, the flow-rate detection characteristic of the thermal-type flow sensor 100 can be uniformized. Thus, the thermal-type flow sensor according to the fifth embodiment of the invention can ensure enhanced detection accuracy and improved reliability throughout an extended use life.

Embodiment 6

In the case of the thermal-type flow sensor according to the first to fifth embodiments of the invention, the constant voltage Vcc applied in the bridge circuit 25 (see FIG. 5) is set to a very small value or level at which spontaneous heat generation of the temperature measuring resistor 14 can not occur. However, the constant voltage Vcc may be set at a necessary minimum level for allowing the spontaneous heat generation to occur in the temperature measuring resistor 14.

More specifically, in the control circuit 50, the constant voltage Vcc (or constant current) in the bridge circuit 25 is set at a level at which spontaneous heat generation can occur in the temperature measuring resistor 14, whereby the temperature measuring resistor 14 is heated to a necessary minimum temperature (e.g. 50° C. in a state where no fluid flow takes place).

In this way, owing to the spontaneous heat generation of the temperature measuring resistor 14, heat loss due to heat conduction to the substrate 1 from the heat generating resistor pattern 4 can be compensated for, while the ratio of the heat transfer by the forced convection to the total heat quantity generated by the heat generating resistor pattern 4 can increase, whereby the flow-rate detection sensitivity of the thermal-type flow sensor 100 can be improved.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although it is shown in FIG. 5 that the constant voltage Vcc is applied to the bridge circuit 25, a constant current may be supplied to the bridge circuit 25. In that case, in order to allow the spontaneous heat generation of the temperature measuring resistor 14, the constant current should be set at a necessary minimum level.

Accordingly, all suitable modifications and equivalents may be resorted to, falling within the spirit and scope of the invention.

What is claimed is:

1. A thermal-type flow sensor, comprising:
a plate-like substrate;
a low heat capacity portion formed on a surface of said substrate;
a heat generating resistor pattern and a temperature measuring resistor disposed on said low heat capacity portion and each formed of a heat-sensitive resistance film; and
a control circuit for applying a constant voltage to said temperature measuring resistor while supplying a heating current to said heat generating resistor pattern for thereby outputting a flow-rate measurement signal derived on the basis of said heating current,
wherein said heat generating resistor pattern and said temperature measuring resistor are disposed essentially in a planar array along a direction in which a fluid destined for measurement flows, and
wherein said temperature measuring resistor is disposed internally of said heat generating resistor pattern at a location upstream of a peak position of a temperature distribution making appearance in the flow direction of said fluid under the action of heat generated by said heat generating resistor pattern.

2. A thermal-type flow sensor according to claim 1,
wherein said temperature measuring resistor is disposed internally of said heat generating resistor pattern at a location upstream of a center portion of said heat generating resistor pattern as viewed in the flow direction of said fluid.

3. A thermal-type flow sensor according to claim 2,
wherein a dummy pattern playing substantially no role in measuring the flow rate is disposed at said low heat capacity portion at a position substantially symmetrically to said temperature measuring resistor.

4. A thermal-type flow sensor according to claim 1,
wherein an arrangement is adopted such that the distribution of temperature making appearance under the action of heat generated by said heat generating resistor pattern is deviated downstream as viewed in the fluid flow direction.

5. A thermal-type flow sensor according to claim 4,
wherein said heat generating resistor pattern is arranged such that a portion of said heat generating resistor pattern located downstream as viewed in the fluid flow direction has a greater resistance value than that of a portion of said heat generating resistor pattern located upstream as viewed in the fluid flow direction.

6. A thermal-type flow sensor according to claim 5,
said heat generating resistor pattern being comprised of sparse and dense portions having different pattern stripe widths, respectively,
wherein said dense portion of a narrower pattern stripe width than that of said sparse portion is disposed downstream of said temperature measuring resistor as viewed in the fluid flow direction.

7. A thermal-type flow sensor according to claim 6,
wherein said temperature measuring resistor is disposed internally of said heat generating resistor pattern at a center portion thereof as viewed in the fluid flow direction.

8. A thermal-type flow sensor according to claim 5,
said heat generating resistor pattern being comprised of thick and thin portions having different pattern thicknesses, respectively,
wherein said thin portion of a smaller pattern thickness than that of said thick portion is disposed downstream of said temperature measuring resistor as viewed in the fluid flow direction.

9. A thermal-type flow sensor according to claim 8,
wherein said temperature measuring resistor is disposed internally of said heat generating resistor pattern at a center portion thereof as viewed in the fluid flow direction.

10. A thermal-type flow sensor according to claim 5,
wherein said temperature measuring resistor is disposed internally of said heat generating resistor pattern at a center portion thereof as viewed in the fluid flow direction.

11. A thermal-type flow sensor according to claim 4,
wherein said heat generating resistor pattern is disposed at said low heat capacity portion at a location upstream of a center portion of said low heat capacity portion as viewed in the fluid flow direction.

12. A thermal-type flow sensor according to claim 11,
wherein said temperature measuring resistor is disposed internally of said heat generating resistor pattern at a center portion thereof as viewed in the fluid flow direction.

13. A thermal-type flow sensor according to claim 4,
wherein said temperature measuring resistor is disposed internally of said heat generating resistor pattern at a center portion thereof as viewed in the fluid flow direction.

14. A thermal-type flow sensor according to claim 1,
wherein said constant voltage applied to said temperature measuring resistor is set to a minimum voltage value at which said temperature measuring resistor can spontaneously generate heat.

* * * * *